(12) United States Patent
Gilbertson et al.

(10) Patent No.: US 12,236,490 B2
(45) Date of Patent: Feb. 25, 2025

(54) SYSTEMS AND METHODS FOR MEDICAL FRAUD DETECTION

(71) Applicant: UnitedHealth Group Incorporated, Minnetonka, MN (US)

(72) Inventors: Thomas R. Gilbertson, Cromwell, CT (US); Raja Mukherji, Dublin (IE); Karen M. Harte, Avon, CT (US); Nasim Mahmud, Dublin (IE); Ryan A. Berberian, Dallas, TX (US); John J. Westhoff, Redding, CA (US); Gregory H. Lyon, Lakeville, MN (US); John B. Cooley, Westfield, IN (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 0 days.

(21) Appl. No.: 18/311,378

(22) Filed: May 3, 2023

(65) Prior Publication Data

US 2024/0370935 A1    Nov. 7, 2024

(51) Int. Cl.
*G06Q 40/00* (2023.01)
*G06Q 40/08* (2012.01)

(52) U.S. Cl.
CPC .................................. *G06Q 40/08* (2013.01)

(58) Field of Classification Search
CPC ..................................................... G06Q 40/08
(Continued)

(56) References Cited

U.S. PATENT DOCUMENTS 6,826,536 B1 * 11/2004 Forman .................. G06Q 10/10
                                                                705/3
7,686,214 B1 *  3/2010 Shao ...................... G06Q 40/03
                                                              235/382
(Continued)

OTHER PUBLICATIONS

Implementation of data mining techniques in upcoding fraud detection in the monetary domains; 2017 International Conference on Innovative Mechanisms for Industry Applications (ICIMIA) (2017, pp. 730-734); Ananthi Sheshasayee, Surya Susan Thomas; Feb. 1, 2017 . . . (Year: 2017).*

(Continued)

*Primary Examiner* — Tien C Nguyen
(74) *Attorney, Agent, or Firm* — Bookoff McAndrews, PLLC

(57) ABSTRACT

Systems and methods are disclosed for determining fraudulent entities. The method includes retrieving characteristics data associated with known fraudulent entities. A first graph is generated based on the characteristics data associated with the known fraudulent entities, the first graph represents relationships among the fraudulent entities and related entities of the known fraudulent entities. Identification data associated with a target entity is received. Characteristics data associated with the target entity is retrieved using the identification data. A second graph is generated based on the characteristics data associated with the target entity, the second graph represents relationships among the target entity and related entities of the target entity. The first graph and the second graph are compared to generate an association score for the target entity. Investigative targets are determined based on the association score. A presentation of the investigative targets is displayed via a graphical user interface of a device.

20 Claims, 7 Drawing Sheets

(58) Field of Classification Search
USPC ..... 705/4, 5, 38, 39, 40; 235/378, 379, 382; 704/502, 9; 709/203, 200; 370/242; 706/45; 707/750
See application file for complete search history.

(56) References Cited

U.S. PATENT DOCUMENTS

| | | | | |
|---|---|---|---|---|
| 10,410,125 | B1* | 9/2019 | Finkelstein | G06N 7/01 |
| 11,354,753 | B1* | 6/2022 | Renegar | G06N 20/00 |
| 11,836,804 | B2* | 12/2023 | Chen | G06F 21/64 |
| 11,941,635 | B1* | 3/2024 | Coleman | G06Q 20/4016 |
| 11,960,993 | B2* | 4/2024 | Boardman | G06Q 40/08 |
| 12,014,371 | B2* | 6/2024 | Edwards | G06V 20/52 |
| 12,079,826 | B1* | 9/2024 | Kumar | G06F 18/2431 |
| 2006/0212487 | A1* | 9/2006 | Kennis | G06Q 40/00 |
| 2011/0238451 | A1* | 9/2011 | Bazzani | G06Q 40/00 |
| | | | | 705/4 |
| 2014/0149129 | A1 | 5/2014 | Getchius | |
| 2014/0278479 | A1 | 9/2014 | Wang et al. | |
| 2015/0134512 | A1* | 5/2015 | Mueller | G06Q 20/4016 |
| | | | | 705/39 |
| 2015/0213002 | A1* | 7/2015 | Gou | G06F 40/30 |
| | | | | 704/9 |
| 2015/0294338 | A1* | 10/2015 | Ketchel, III | G06Q 20/065 |
| | | | | 705/2 |
| 2016/0379309 | A1 | 12/2016 | Shikhare | |
| 2020/0242615 | A1* | 7/2020 | Chandra | G06F 16/9024 |
| 2021/0241278 | A1* | 8/2021 | Kala | G06Q 50/265 |
| 2021/0350468 | A1* | 11/2021 | Prevatt | G06Q 40/08 |
| 2022/0044256 | A1* | 2/2022 | Lakshminarayanan | |
| | | | | G06N 3/045 |
| 2022/0103589 | A1* | 3/2022 | Shen | G06Q 10/0635 |
| 2023/0035564 | A1* | 2/2023 | Dong | G16H 50/20 |
| 2024/0070671 | A1* | 2/2024 | Fenichel | G06Q 30/0609 |

OTHER PUBLICATIONS

Bai, Yunsheng, Hao Ding, Song Bian, Ting Chen, Yizhou Sun, and Wei Wang. "Simgnn: A neural network approach to fast graph similarity computation." In Proceedings of the Twelfth ACM International Conference on Web Search and Data Mining, pp. 384-392. 2019.: https://arxiv.org/abs/1808.05689.

Kipf, Thomas N., and Max Welling. "Semi-supervised classification with graph convolutional networks." arXiv preprint arXiv:1609.02907 (2016). https://arxiv.org/abs/1609.02907.

Soar Cognitive Architecture. https://soar.eecs.umich.edu/.

* cited by examiner

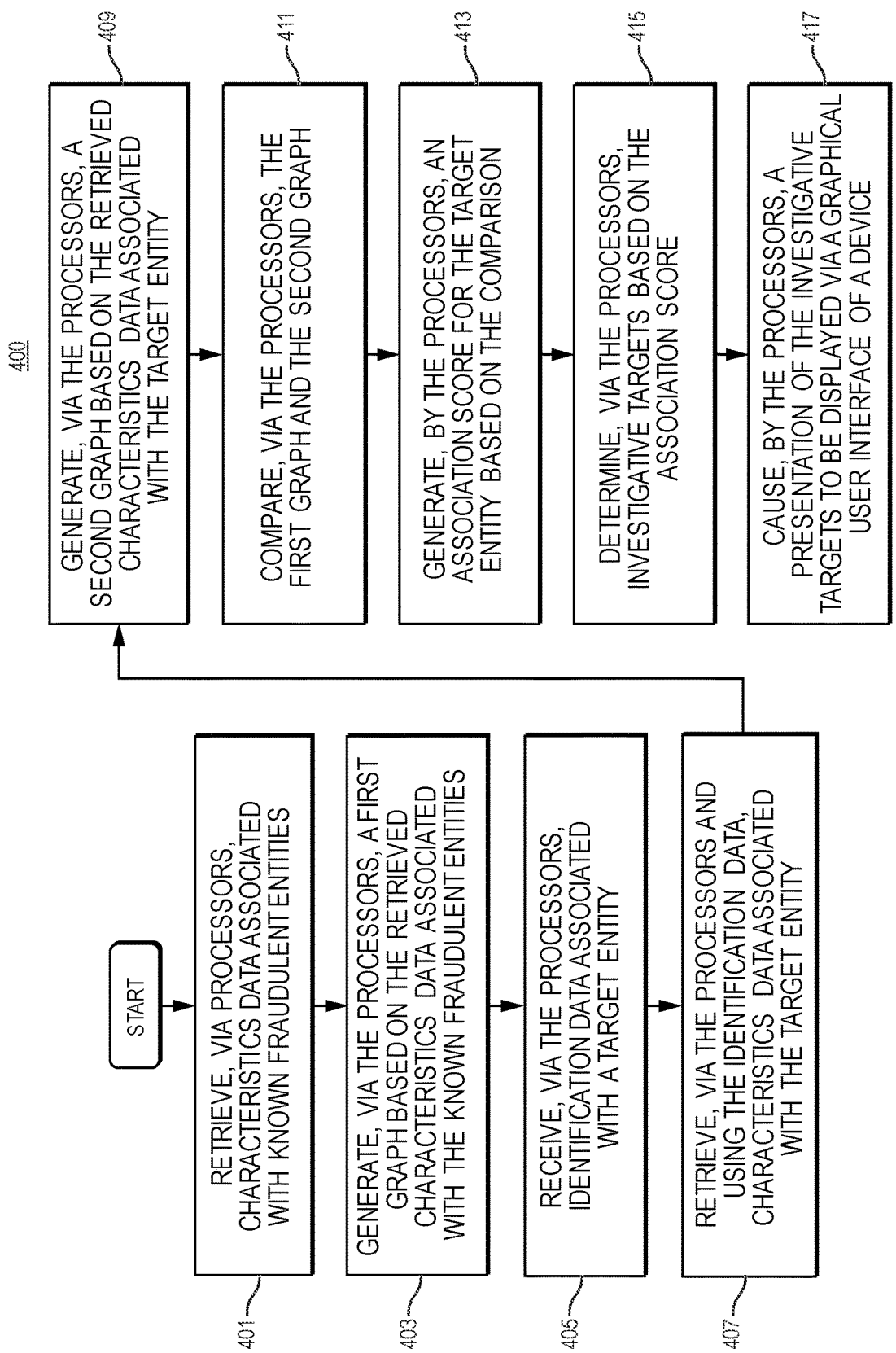

SYSTEMS AND METHODS FOR MEDICAL FRAUD DETECTION

TECHNICAL FIELD

The present disclosure relates generally to healthcare fraud detection, and more particularly, to systems and methods for preventing fraud in the field of medical insurance.

BACKGROUND

Currently, provider entities (e.g., doctors, pharmacies, healthcare providers, etc.) provide healthcare services to beneficiaries (e.g., patients), and submit healthcare claims to payer entities (e.g., insurance companies) for the provision of such services. Submission of fraudulent claims by provider entities to payer entities is a huge problem. For example, healthcare providers may submit fraudulent claims by billing for services or procedures that were never rendered, charging for a more expensive procedure than what was actually performed, falsifying a patient's diagnosis to justify unnecessary tests or procedures, etc. To prevent fraudulent claims, the current regulatory and legal environment requires specialized human investigators to research potentially fraudulent providers, amass evidence, and ultimately seek a defensible, low-risk legal business decision to stop doing business with the provider targeted for investigation.

However, specialized human investigators are in short supply and it can take years to train new ones, and given the large volume of claims, it would be challenging for specialized human investigators to ensure each claim is thoroughly reviewed for signs of fraud to determine potentially fraudulent providers. Moreover, an entity committing fraud may be difficult to locate because the entity may not be a legitimate person, organization, business, etc. Furthermore, relying on specialized human investigators to track down and build cases against fraudulent entities is a time-consuming and inefficient process.

Unless otherwise indicated herein, the materials described in this section are not prior art to the claims in this application and are not admitted to be prior art, or suggestions of the prior art, by inclusion in this section.

SUMMARY OF THE DISCLOSURE

The present disclosure solves this problem and/or other problems described above or elsewhere in the present disclosure and improves the state of conventional healthcare applications.

The payer entities often receive medical claims that are fraudulent or do not represent a real treatment, medical device, or service that was actually performed on a patient by the provider entities. Conventional methods that are utilized to monitor the potentially fraudulent medical claims are outdated, costly, and inefficient. Given the large volume of claims, it is prohibitively time-consuming for specialized human investigators to ensure each claim or provider entity is thoroughly reviewed. Instead, the majority of claims and the associated provider entities submitted to the payer entities are not fully evaluated for signs of fraud or abuse. There is a need for a method that reduces these labor-intensive responsibilities and improves efficiency and accuracy in analyzing the data.

In some embodiments, a computer-implemented method for determining fraudulent entities is disclosed. The computer-implemented method includes: retrieving, via one or more processors, characteristics data associated with one or more known fraudulent entities; generating, via the one or more processors, a first graph based on the retrieved characteristics data associated with the one or more known fraudulent entities, the first graph representing relationships among the one or more fraudulent entities and one or more related entities of the one or more known fraudulent entities; receiving, via the one or more processors, identification data associated with a target entity; retrieving, via the one or more processors and using the identification data, characteristics data associated with the target entity; generating, via the one or more processors, a second graph based on the retrieved characteristics data associated with the target entity, the second graph representing relationships among the target entity and one or more related entities of the target entity; comparing, via the one or more processors, the first graph and the second graph; generating, by the one or more processors, an association score for the target entity based on the comparison; determining, via the one or more processors, one or more investigative targets based on the association score; and causing, by the one or more processors, a presentation of the one or more investigative targets to be displayed via a graphical user interface of a device.

In some embodiments, a system for determining fraudulent entities is disclosed. The system includes one or more processors; and at least one non-transitory computer readable medium storing instructions which, when executed by the one or more processors, cause the one or more processors to perform operations including: retrieving characteristics data associated with one or more known fraudulent entities; generating a first graph based on the retrieved characteristics data associated with the one or more known fraudulent entities, the first graph representing relationships among the one or more fraudulent entities and one or more related entities of the one or more known fraudulent entities; receiving identification data associated with a target entity; retrieving, using the identification data, characteristics data associated with the target entity; generating a second graph based on the retrieved characteristics data associated with the target entity, the second graph representing relationships among the target entity and one or more related entities of the target entity; comparing the first graph and the second graph; generating an association score for the target entity based on the comparison; determining one or more investigative targets based on the association score; and causing a presentation of the one or more investigative targets to be displayed via a graphical user interface of a device.

In some embodiments, a non-transitory computer readable medium for determining fraudulent entities is disclosed. The non-transitory computer readable medium stores instructions which, when executed by one or more processors, cause the one or more processors to perform operations including: retrieving characteristics data associated with one or more known fraudulent entities; generating a first graph based on the retrieved characteristics data associated with the one or more known fraudulent entities, the first graph representing relationships among the one or more fraudulent entities and one or more related entities of the one or more known fraudulent entities; receiving identification data associated with a target entity; retrieving, using the identification data, characteristics data associated with the target entity; generating a second graph based on the retrieved characteristics data associated with the target entity, the second graph representing relationships among the target entity and one or more related entities of the target entity; comparing the first graph and the second graph; generating an association score for the target entity based on the comparison; determining one or more investigative targets based on the association score; and causing a presentation of the one or more investigative targets to be displayed via a graphical user interface of a device.

It is to be understood that both the foregoing general description and the following detailed description are example and explanatory only and are not restrictive of the detailed embodiments, as claimed.

BRIEF DESCRIPTION OF THE DRAWINGS

The accompanying drawings, which are incorporated in and constitute a part of this specification, illustrate various example embodiments and together with the description, serve to explain the principles of the disclosed embodiments.

FIG. 4 is a flowchart of an example process for determining fraudulent entities associated with medical insurance, according to some embodiments of the disclosure.

DETAILED DESCRIPTION OF EMBODIMENTS

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for determining fraudulent entities associated with medical insurance.

The decision to stop paying future claims of the potentially fraudulent provider post-investigation is called 'hard denying' the provider, and it involves stopping all future claims submitted to the payer from the potentially fraudulent provider. However, current approaches for identifying investigative leads result in a low industry-wide hard deny rate of investigations and often much lower results for certain specialty providers and schemes. The current approaches towards fraud target identification focus almost exclusively on the claim history of the provider that is paired with an expected type of fraud (the scheme) to identify potential fraud and lead to a low true positive rate. For example, once hard denied, the owners (e.g., individual natural persons) of the fraudulent providers can open a new corporate entity the same day and resume their fraud under a new identity unencumbered by the 'claims history' that would trigger an investigation for their new legal entity. Hence, the fraudulent activity is often 'shifted' but not really stopped.

The low true positive rate not only wastes investigative resources but also allows a huge amount of fraud to go undetected. Most of the current healthcare fraud detection methods are slow to identify new approaches (e.g., schemes) to healthcare fraud. Those committing the fraud are constantly probing weaknesses in the system and innovating new approaches to commit fraud. Since the current approaches to fraud detection rely on a history of claims, it is challenging to identify new types of fraud until it has been happening for a substantial amount of time and with the associated losses already incurred.

Figure 1:
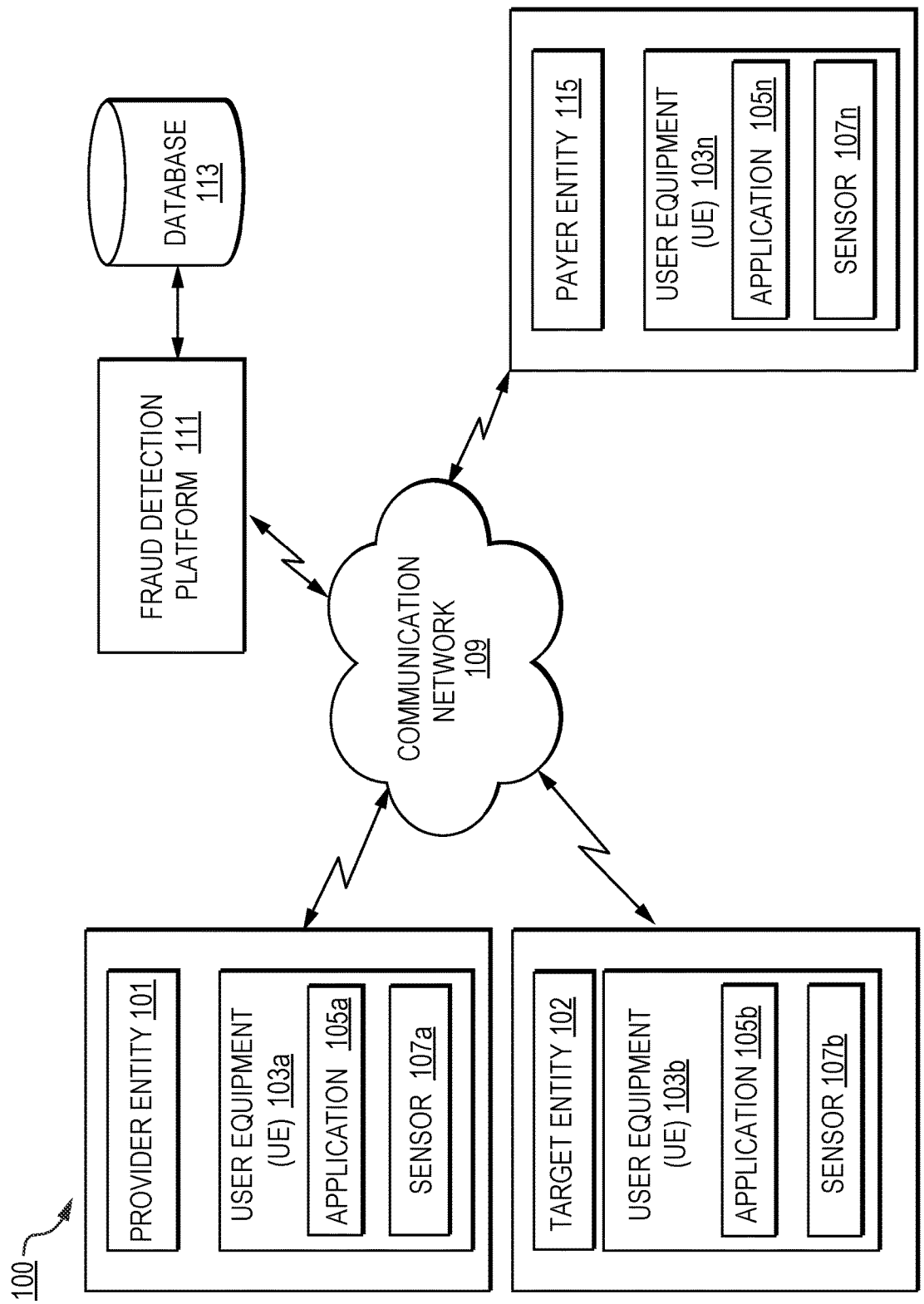
FIG. 1 is a diagram showing an example of a system that is capable of determining fraudulent entities associated with medical insurance, according to some embodiments of the disclosure.

To address these challenges, FIG. 1 introduces a capability to implement modern communication and data processing capabilities into methods and systems for determining fraudulent entities associated with medical insurance. FIG. 1, an example architecture of one or more example embodiments of the present invention, includes a system 100 that comprises a provider entity 101, a target entity 102, user equipment (UE) 103a-103n (collectively referred to as UE 103) that includes applications 105a-105n (collectively referred to as an application 105) and sensors 107a-107n (collectively referred to as a sensor 107), a communication network 109, a fraud detection platform 111, a database 113, and a payer entity 115.

System 100 provides a systematic approach to labeling provider entities with a relative score indicating how likely they are to be 'hard denied' should they be investigated. The score comes with a very high true positive rate and an explanation of why each provider entity is a good investigative target based on their level of association with known, historic fraudulent activity. The system 100 incorporates technologies and techniques to yield a 'true positive' rate of hard denies, e.g., greater than 75%, 80%, or any other pre-determined threshold. Once a score is generated and the explanation documented, the results are returned through a service delivery mechanism to allow human business interpretation and the initiation of provider fraud investigations. System 100 generates high-quality investigative targets that may be 'hard denied' after strict human-lead legal and investigative processes capped by legal-reviewed business decisions to 'hard deny' or not. The veracity, complexity, and steps for each specific-human review process may vary from Payer to Payer.

In one instance, a particular treatment is prescribed to patients based on their health conditions or diagnosis by the provider entity 101 or the target entity 102 (e.g., physicians, healthcare service providers, clinics, etc.). Prior to, during, or subsequent to the patients being treated by the provider entity 101 or the target entity 102, a representative of the provider entity 101 or the target entity 102 enters the appropriate current procedural terminology (CPT) treatment codes for the medical treatment provided and/or the ICD9 diagnostic codes into the UE 103 associated with the provider entity 101 or the target entity 102. In one embodiment, the CPT treatment codes and/or the ICD9 diagnostic code(s) are transmitted with data relating to the patient (e.g., medical records, current health conditions, medical history, personal information, etc.), and the provider entity 101 or the target entity 102 (e.g., license number, contact information, location information, employee information, insurance information, historical claims information, or any other relevant information). In one embodiment, the provider entity 101 is a known fraudulent entity (e.g., known bad actor provider) that has been previously hard denied. In one embodiment, target entity 102 is a potentially fraudulent entity (e.g., unknown provider) that has not been hard denied or a non-fraudulent entity (e.g., good actor provider).

In one embodiment, the UE 103 includes, but is not restricted to, any type of mobile terminal, wireless terminal, fixed terminal, or portable terminal. Examples of the UE 103, include, but are not restricted to, a mobile handset, a wireless communication device, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including the accessories and peripherals of these devices, or any combination thereof. In addition, the UE 103 facilitates various input means for receiving and generating information, including, but not restricted to, a touch screen capability, a keyboard, and keypad data entry, a voice-based input mechanism, and the like. Any known and future implementations of the UE 103 are also applicable.

In one embodiment, the application 105 includes various applications such as, but not restricted to, content provisioning applications, software applications, networking applications, multimedia applications, media player applications, camera/imaging applications, application services, storage services, contextual information determination services, location-based services, notification services, social networking services, and the like. In one embodiment, one of the application 105 at the UE 103 acts as a client for the fraud detection platform 111 and performs one or more functions associated with the functions of the fraud detection platform 111 by interacting with the fraud detection platform 111 over the communication network 109.

By way of example, each sensor 107 includes any type of sensor. In one embodiment, the sensors 107 include, for example, a network detection sensor for detecting wireless signals or receivers for different short-range communications (e.g., Bluetooth, Wi-Fi, Li-Fi, near field communication (NFC), etc. from communication network 109), a global positioning sensor for gathering location data (e.g., location associated with the patients, the provider entity 101, the target entity 102, and/or the payer entity 115), a camera/imaging sensor for gathering image data (e.g., images of invoices from the provider entity 101 or the target entity 102), an audio recorder for gathering audio data (e.g., recordings of treatments, etc.), and the like.

In one embodiment, various elements of the system 100 communicate with each other through the communication network 109. The communication network 109 supports a variety of different communication protocols and communication techniques. In one embodiment, the communication network 109 allows the fraud detection platform 111 to communicate with the UE 103. The communication network 109 of the system 100 includes one or more networks such as a data network, a wireless network, a telephony network, or any combination thereof. It is contemplated that the data network is any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network is, for example, a cellular communication network and employs various technologies including 5G (5th Generation), 4G, 3G, 2G, Long Term Evolution (LTE), wireless fidelity (Wi-Fi), Bluetooth®, Internet Protocol (IP) data casting, satellite, mobile ad-hoc network (MANET), vehicle controller area network (CAN bus), and the like, or any combination thereof.

In one embodiment, the fraud detection platform 111 is a platform with multiple interconnected components. The fraud detection platform 111 includes one or more servers, intelligent networking devices, computing devices, components, and corresponding software for determining fraudulent entities associated with medical insurance. In addition, it is noted that the fraud detection platform 111 may be a separate entity of the system 100. As previously discussed, specialized human investigators are in short supply, hence it is important to determine targets or leads for the fraud investigators that are highly likely to result in a hard deny once the investigation is complete. The fraud detection platform 111 identifies various types of fraud early (e.g., previously occurred frauds, new types of frauds, etc.), solves the 'low-true positive rate' problem, and prevents the bad actor providers from promptly resuming fraud in the near future. The fraud detection platform 111 detects fraudulent entities in a novel way without using medical claims. For example, the fraudulent entities are identified independent of any medical claims (e.g., historical healthcare claims).

In one embodiment, the fraud detection platform 111 can take the target entity 102 and assess them as a potential fraud investigation target against a body of previously identified fraudulent providers (e.g., the provider entity 101) based on a sophisticated analysis of their level of association with known fraud. In one example embodiment, the known fraudulent provider entities and their attributes (e.g., corporate officers, practice managers, registered agents, etc. along with their addresses, phone numbers, and alike) form the provider entity 101. The provider entity 101 is either a legal entity or a natural person, or both, and when the provider entity 101 shares certain attributes, it creates a connection mesh. For example, Jane Smith is an officer at two different provider entities 101, and one of these provider entities 101 shares an address with a third provider entity 101. Jane Smith and the three provider entities 101 with the connecting information form a graph of their association.

In one embodiment, the fraud detection platform 111 takes the target entity 102 to be evaluated for fraudulent connections and adds them to the graph of the provider entity 101. The target entity 102 either passes through the graph with no connections, gets caught up slightly with a few connections, or is completely entangled with many connections. The fraud detection platform 111 measures the types, numbers, and patterns of the connectedness of the target entity 102 with the provider entity 101, and arrives at a relative score indicative of the association with fraud and its expected value as an investigative target.

In one embodiment, the fraud detection platform 111 generates bigger graphs by adding fraudulent entities and associated natural persons to the graph of the provider entity 101, and the weave of the graph is made smaller by adding more attributes associated with the fraudulent entities. These attributes can become the connection points, and the bigger graphs with these attributes capture more investigative targets. Discernment of the value of what is caught in the graph is accomplished via measurements through a scoring mechanism, as discussed in detail below.

In one embodiment, the database 113 is any type of database, such as relational, hierarchical, object-oriented, key-value pairs, and/or the like, wherein data are organized in any suitable manner, including data tables or lookup tables. In one embodiment, the database 113 accesses or stores content associated with the patients, the provider entity 101, the target entity 102, the UE 103, the fraud detection platform 111, and the payer entity 115, and manages multiple types of information that provide means for aiding in the content provisioning and sharing process. The database 113 includes various information related to the provider entity 101 and/or the target entity 102 including contact data, location data, historical data (e.g., past claims data, past fraud data, etc.), employee data, customer data, and so on. It is understood that any other suitable data may be included in the database 113. In another embodiment, the database 113 includes a machine-learning based training database with a pre-defined mapping defining a relationship between various input parameters and output parameters based on various statistical methods. For example, the training database includes machine-learning algorithms to learn mappings between input parameters related to the provider entity 101 or the target entity 102, e.g., contact information, work-related information, etc. In one embodiment, the training database includes a dataset that includes data collections that are not subject-specific, e.g., data collections based on population-wide observations, local, regional or super-regional observations, and the like. Example datasets include demographic data, claim fraud data, fraudulent provider data, encyclopedias, scientific and medical-related periodicals and journals, research studies data, physician and hospital/clinic data, and the like. In an embodiment, the training database is routinely updated and/or supplemented based on machine learning methods.

One of the purpose of the system 100 is to prevent medical billing fraud from being perpetuated on the payer entity 115. The payer entity 115 finances or reimburses the cost of health services. In one example embodiment, the payer entity 115 includes private medical insurance companies or public medical insurance companies administering private, federally-sponsored, and/or state-sponsored medical insurance programs. The Payer entity 115 interacts with provider entity 101 or the target entity 102 via communication network 109 for billing-related inquiries, accounting-related inquiries, payment-related inquiries, reimbursement inquiries, portioning of an invoice to split the payment, distribution of payment per contracts with the patients, the provider entity 101, or the target entity 102.

By way of example, the UE 103 and the fraud detection platform 111 communicate with each other and other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
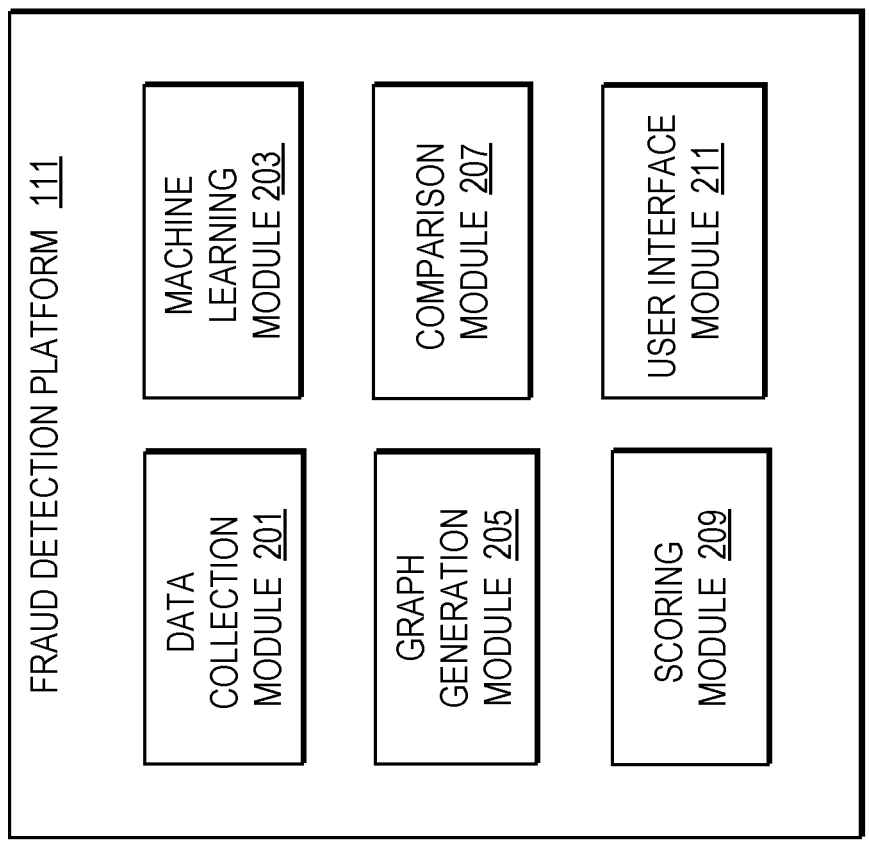
FIG. 2 is a diagram of the components of fraud detection platform 111, according to some embodiments of the disclosure.

FIG. 2 is a diagram of the components of the fraud detection platform 111, according to some aspects of the disclosure. As used herein, terms such as "component" or "module" generally encompass hardware and/or software, e.g., that a processor or the like is used to implement associated functionality. By way of example, the fraud detection platform 111 includes one or more components for determining fraudulent entities associated with medical insurance. It is contemplated that the functions of these components are combined in one or more components or performed by other components of equivalent functionality. In one embodiment, the fraud detection platform 111 comprises a data collection module 201, a machine learning module 203, a graph generation module 205, a comparison module 207, a scoring module 209, and a user interface module 211, or any combination thereof.

In one embodiment, the data collection module 201 collects relevant data, e.g., contact information, location information, employee information, etc., associated with the provider entity 101 or the target entity 102 through various data collection techniques. In one embodiment, the data collection module 201 uses a web-crawling component to access various databases, e.g., the database 113, or other information sources, e.g., any third-party databases, to collect relevant data associated with the provider entity 101 or the target entity 102. In one embodiment, the data collection module 201 includes various software applications, e.g., data mining applications in Extended Meta Language (XML), that automatically search for and return relevant data regarding the provider entity 101 or the target entity 102. In another embodiment, the data collection module 201 parses and arranges the collected data. In one example embodiment, the data collection module 201 examines the collected data for any errors to eliminate bad data, e.g., redundant, incomplete, or incorrect data, to create high-quality data. In another example embodiment, the data collection module 201 converts the collected data, e.g., raw data, into a common format, e.g., machine readable form, that is easily processed by other modules and platforms. The data is then subjected to various data processing methods using machine learning and artificial intelligence algorithms to generate a desired output.

In one embodiment, the machine learning module 203 is configured for unsupervised machine learning that does not require training using known outcomes 518. The unsupervised machine learning utilizes machine learning algorithms to analyze and cluster unlabeled datasets and discover hidden patterns or data groupings, e.g., similarities and differences within data, without supervision to determine fraudulent entities associated with medical insurance. In one example embodiment, the unsupervised machine learning implements approaches that includes clustering (e.g., deep embedded clustering, K-means clustering, hierarchical clustering, probabilistic clustering), association rules, classification, principal component analysis (PCA), or the like. In another embodiment, the machine learning module 203 is configured for supervised machine learning that utilizes training data, e.g., training data 512 illustrated in the training flow chart 500, for training a machine learning model configured to determine fraudulent entities associated with medical insurance. In one example embodiment, the machine learning module 203 performs model training using training data, e.g., data from other modules, that contains input and correct output, to allow the model to learn over time. The training is performed based on the deviation of a processed result from a documented result when the inputs are fed into the machine learning model, e.g., an algorithm measures its accuracy through the loss function, adjusting until the error has been sufficiently minimized. In one embodiment, the machine learning module 203 randomizes the ordering of the training data, visualizes the training data to identify relevant relationships between different variables, identifies any data imbalances, and splits the training data into two parts where one part is for training a model and the other part is for validating the trained model, de-duplicating, normalizing, correcting errors in the training data, and so on. The machine learning module 203 implements various machine learning techniques, e.g., neural network (e.g., recurrent neural networks, graph convolutional neural networks, deep learning neural networks), decision tree learning, association rule learning, inductive programming logic, K-nearest neighbors, cox proportional hazards model, support vector machines, Bayesian models, Gradient boosted machines (GBM), LightGBM (LGBM), Xtra tree classifier, etc. Implementation of the machine learning module 203 is discussed in detail below.

In one embodiment, the graph generation module 205 generates a first graph based on data associated with the provider entity 101 (e.g., fraudulent provider entity). For example, the graph generation module 205 generates a graph of nodes, edges, and links representative of various connections associated with the provider entity 101. In another embodiment, the graph generation module 205 generates a second graph based on data associated with the target entity 102 (e.g., potentially fraudulent provider entity, non-fraudulent provider entity). For example, the graph generation module 205 generates a sub-graph of nodes, edges, and links representative of various connections associated with the target entity 102. In a further embodiment, the graph generation module 205 generates a fused graph based on various graph computation mechanisms, wherein the fused graph comprises the first and second graphs. The graph generation module 205 is discussed in further detail below.

In one embodiment, the comparison module 207 receives the graphs (e.g., the first and second graphs) from the graph generation module 205. The comparison module 207 is configured to compare the received graphs to identify connections (e.g., associations) between the graphs based on certain techniques. In one example embodiment, comparison module 207 utilizes comparison techniques such as, but not limited to, node similarity matrix analysis, subgraph matching, local edge similarity techniques, node labeling, isomorphism comparison techniques, intermediate graph identification techniques, minimum and/or maximum common subgraph analysis, node and/or edge similarity score techniques, combinations of the foregoing, or the like to identify similarities between the graphs. Implementation of the comparison module 207 is discussed in detail below.

In one embodiment, the scoring module 209 evaluates the connection between one or more graphs (e.g., first and second graphs) and generates association scores based on the connectivity. In one example embodiment, the association score for one or more graphs may be the number of features (e.g., nodes, links, or edges) that match or it may be a more complicated combination of feature comparison scores involving differential weighting of features, and comparison using various methods. In one example embodiment, the association score that is above a score threshold indicates a higher association between the provider entity 101 and target entity 102. The association score below the score threshold indicates a lower association between the provider entity 101 and target entity 102. The scoring module 209 is discussed in further detail below.

In one embodiment, the user interface module 211 enables a presentation of a graphical user interface (GUI) in the UE 103 that facilitates visualization of graphs and association scores related to the provider entity 101 or the target entity 102. The user interface module 211 employs various application programming interfaces (APIs) or other function calls corresponding to the application 105 on the UE 103, thus enabling the display of graphics primitives such as graphs, icons, menus, buttons, data entry fields, etc. In another embodiment, the user interface module 211 causes interfacing of guidance information to include, at least in part, one or more annotations, audio messages, video messages, or a combination thereof pertaining to fraud notification. In another example embodiment, the user interface module 211 operates in connection with augmented reality (AR) processing techniques, wherein various applications, graphic elements, and features interact to present graphs, association scores, fraud notifications, etc., in a format that is understandable by the recipients, e.g., service providers.

The above-presented modules and components of the fraud detection platform 111 are implemented in hardware, firmware, software, or a combination thereof. Though depicted as a separate entity in FIG. 2, it is contemplated that the fraud detection platform 111 is also implemented for direct operation by the respective UE 103. As such, the fraud detection platform 111 generates direct signal inputs by way of the operating system of the UE 103. In another embodiment, one or more of the modules 201-211 are implemented for operation by the respective UEs, as the fraud detection platform 111. The various executions presented herein contemplate any and all arrangements and models.

Figure 3A:
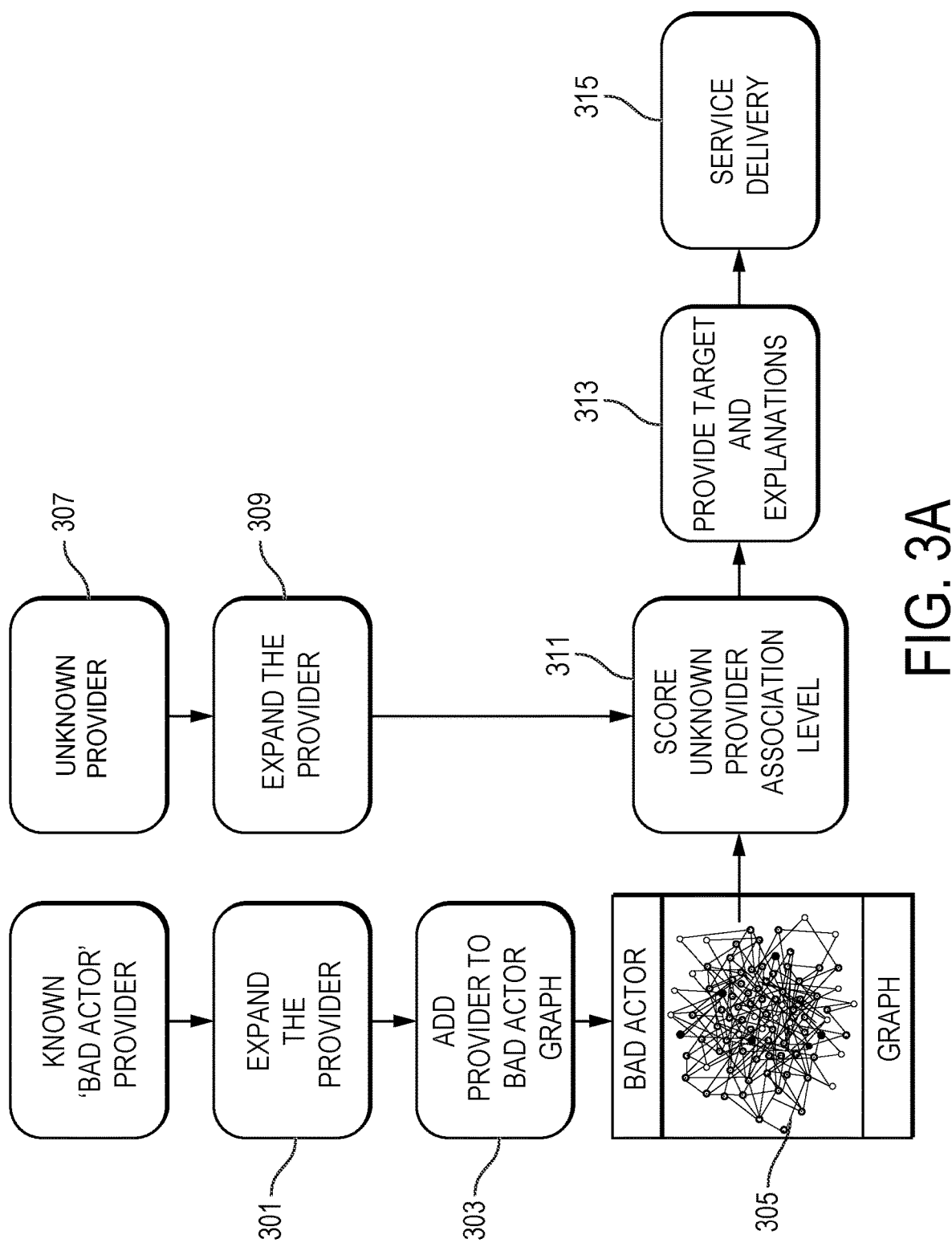
FIGS. 3A-B are diagrams that illustrate an example process for determining fraudulent entities associated with medical insurance, according to some embodiments of the disclosure.
Figure 3B:
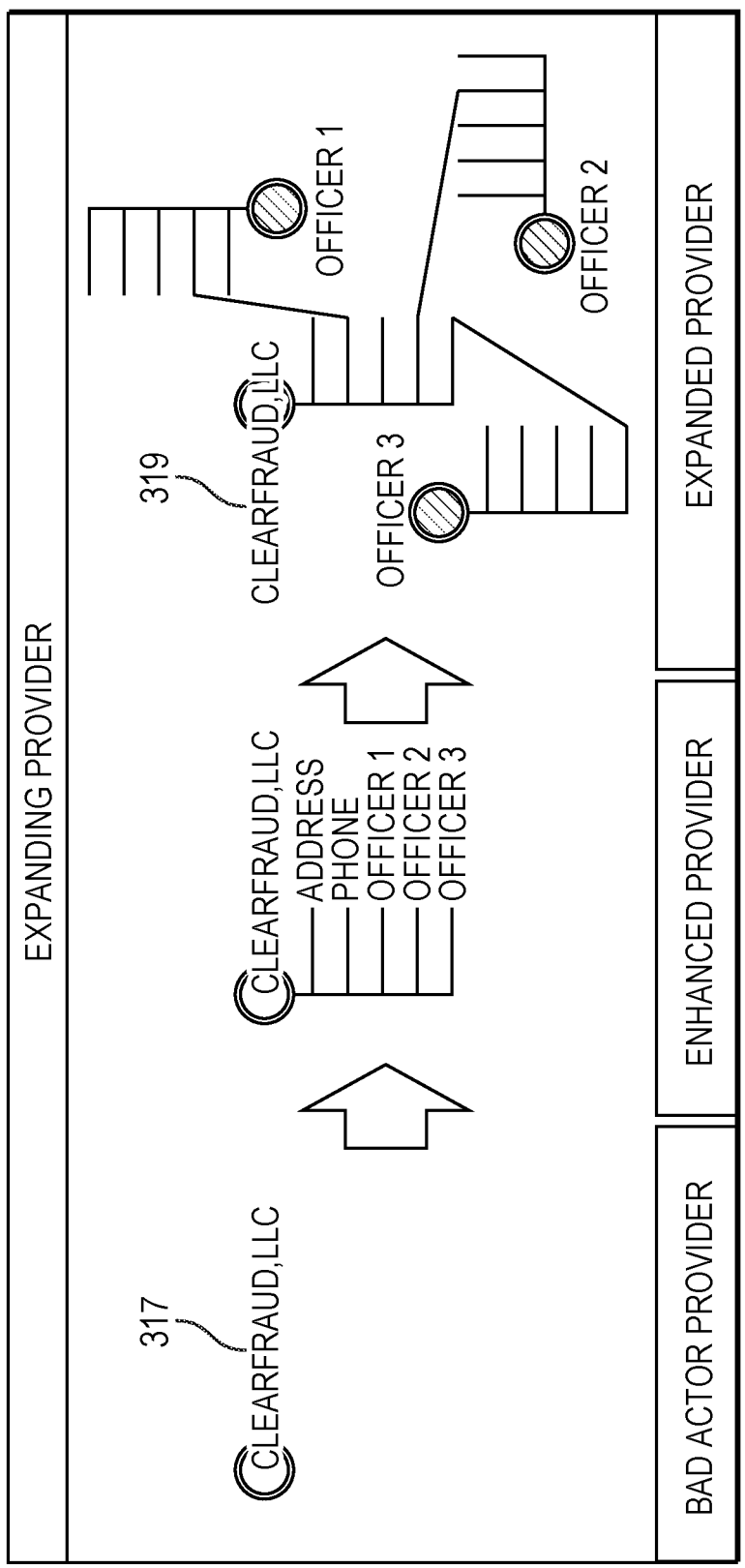

FIGS. 3A-B are diagrams that illustrate an example process for determining fraudulent entities associated with medical insurance, according to some embodiments of the disclosure. Although FIGS. 3A-B are illustrated and described as a sequence of steps, it is contemplated that various embodiments of FIGS. 3A-B are performed in any order or combination and need not include all of the illustrated steps.

In step 301, the fraud detection platform 111, via the graph generation module 205, creates and expands the graph for known bad actor providers (e.g., the provider entity 101) to incorporate all of their connections with the current data sources. For example, in FIG. 3B, ClearFraud, LLC 317 is a known bad actor provider. The fraud detection platform 111 explores various data sources (e.g., database 113) and extracts relevant data (e.g., location information, contact information, employee information, connections, etc.) on the ClearFraud, LLC 317. A bad actor graph 319 (e.g., known bad actor association graph) on ClearFraud, LLC 317 is expanded by adding the extracted relevant data. This process is repeated for all known bad actor providers at a point in time (e.g., real-time, near real-time, or on a scheduled basis).

In step 303, the fraud detection platform 111, via the graph generation module 205, maintains the known bad actor association graph by, for example, adding the information or the graph associated with the bad actor provider to the known bad actor association graph. The fraud detection platform 111 can augment performance by creating a known good actor graph along with the known bad actor association graph. In one embodiment, the fraud detection platform 111 maintains and expands the known bad actor association graph via a dynamic fetching approach. The fraud detection platform 111, via data collection module 201, receives a set of bad actor seeds (e.g., department of justice (DOJ) indictments, names of known bad actors, addresses previously associated with fraud hotspots, identifiers of existing hard-denied providers, etc.) as input. The fraud detection platform 111 enters the bad actor seeds into the graph for the known bad actor providers, and the bad actor seeds are further expanded upon using several data sources, each of which is customized as necessary.

In one embodiment, the fraud detection platform 111 first stores the data on the known bad actor providers in a schema-less data store, where intelligent agent scripts using any of a known set of Cognitive Architectures, research and aggregate data on the known bad actor providers. Many data sources have pricing schemes that limit the number of application programming interface (API) calls in some fixed interval of time. To reduce cost, the intelligent agent scripts prioritize fetching certain pieces of information on certain providers or take advantage of use-it-or-lose-it pricing schemes by fetching data on lower-priority targets in the event that no high-priority targets exist. To further reduce cost, API calls are cached on a separate server, allowing subsequent fetches of already-fetched data to be returned immediately without incurring additional charges.

In one embodiment, the fraud detection platform 111, via the graph generation module 205, reconstructs the known bad actor association graph from the schema-less knowledge store. The intelligent agent scripts are updated to extract new information from data sources, or to make different decisions on the data. These updated scripts are re-run only on the necessary data, lowering the computation requirements in rebuilding the graph. The assumptions the agent scripts make can be determined to be false (e.g., two people with the same name may be determined to be different people), these assumptions can be encoded into the schema-less data store to break the necessary links in the known bad actor association graph.

In one embodiment, the fraud detection platform 111, via the graph generation module 205, generates a known bad actor association graph 305 (e.g., a graph database 305 of identified known bad actor providers) as an output. The known bad actor association graph 305 captures the known bad actors, their attributes, and their associations, with the intent that unknown providers may be temporarily inserted to check for connectedness and similarity in structure to known bad actors. There are many ways to provide attribute enhancements and many ways to maintain the sources of the data for the known bad actor association graph 305. For example, these can be done manually by humans, via a set of rules-based batch programs, or by intelligent agents via a cognitive architecture (e.g., Soar). The cognitive architecture could be layered to have one or more intelligent agents optimize the enhancement and maintenance of the underlying graph and approaches to the computation of target scores.

In step 307 the fraud detection platform 111, via data collection module, detects unknown providers based, at least in part, on two hypotheses:
(i) Fraudulent people remain fraudulent: Once people are recognized as being fraudulent, they rarely change their behavior. They may engage in different types of fraud, and to a greater or lesser extent, but they tend to stay fraudulent.
(ii) Fraudulent people tend to associate with other fraudulent people:
People who tend to engage in fraud are more likely to associate with those also predisposed to fraudulent behavior. Fraudulent people can be identified by those they associate with and vice versa.

In one embodiment, the fraud detection platform 111 does not utilize historical healthcare claims data to detect unknown providers. The fraud detection platform 111 augments the detection of unknown providers by utilizing open-source data, paid data, government data, and/or proprietary healthcare claims data from the payer entity. The fraud detection platform 111 augments the performance of scoring or presentation of possible 'bad actor' providers by utilizing 'analytics' or 'machine learning' techniques along with other data sources. In one embodiment, such provider fraud detection is a controlled and tunable process, and is agnostic of the payer entity 115 using the solution.

In step 309 the fraud detection platform 111, via the comparison module 207, expands the associations and characteristics of unknown providers in a similar manner as with each bad actor provider, in order to evaluate the unknown providers against the known bad actor association graph. In one embodiment, the fraud detection platform 111 achieves attribute enhancements and sources maintenance by utilizing various input data associated with the unknown providers (e.g., tax identification number (TIN), national provider identifier (NPI), etc.). The input data is provided automatically as new providers begin filing the claims with the payers.

The fraud detection platform 111, via the data collection module 201, queries a customizable set of data sources (e.g., the database 113) based on the input data to determine other information on unknown providers. In one embodiment, this process can be recursive, and people associated with unknown providers are queried for information on other providers they are associated with. In another embodiment, this process need not be static, as unknown providers checked in the past are automatically re-evaluated (e.g., in real-time, near real-time, or fixed intervals), or due to various events (e.g., events potentially connected with hard-denied providers like a company being sold). The fraud detection platform 111 generates a graph (e.g., a sub-graph) including a set of nodes, edges, and/or attributes based on the querying, for insertion of the graph into the bad actor association graph to check for connections and patterns. In one embodiment, the fraud detection platform 111 utilizes a fuzzy matching algorithm to identify hidden duplicate nodes. For example, duplicate nodes can be a person that appeared as two different entities in the graph. When a person moves from one organization, it is difficult to identify the same person in a new organization unless the change is explicitly declared. The fuzzy matching algorithm can approximate and identify the two apparently different people to be in fact the same person.

In step 311, the fraud detection platform 111, via the scoring module 209, scores the association level of an unknown provider (e.g., a provider whose legal entity has not previously been hard denied) to the known bad actor providers. The fraud detection platform 111 implements a scoring mechanism comprising one or more of the following approaches used as an ensemble with configurable customized scoring and changes to the scoring approach being a feature. The scoring mechanisms determine a fraud association score for the unknown provider (e.g., individuals or associations that are not legal entities in a strict sense, such as organized crime syndicates). In one embodiment, the fraud association score starts from 0 to 1 resulting from the current configuration of the combination of techniques being used in practice. Various users can choose separate configurations and change the configurations to their needs at any time, for example, health insurer A wants a configuration that generates more targets with a higher false positive rate, whilst health insurer B wants fewer targets and a higher true positive rate.

In one embodiment, the fraud detection platform 111, via the machine learning module 203 and the scoring module 209, utilizes various techniques during the scoring of the unknown provider's association level to the bad actors. The techniques include one or more of:
1. Conventional Graph Connectivity Approach: The subscore is created by measuring and weighting the connections from the unknown provider to the known bad actor providers. This approach includes:
   (i) Count of connections: the number of paths to fraud;
   (ii) Type of connections: the specific type of share attribute that creates the connection, for example, "shared officer" or "common phone number";
   (iii) Depth of connections: the number of hops needed to lead to the level of known fraudulent activity; and
   (iv) Weighting Combinations: Any weighting approaches and combinations of approaches may be utilized. Some weightings are clear, for example, a natural weighting for a "shared parking lot" leads is proximity, where "same address" has a weightage of 1, whereas "a few buildings over" has a lower number (e.g., 0.1). In another example, for shared officers, the probability that the officers are the same person is weighted. In a further example, for shared numbers (and addresses), purpose is a source of weighting. A shared fax number or place of service number is a stronger connection than shared billing numbers.
2. A sub-graph similarity approach: This approach utilizes brute force and deep learning for:
   (i). Extracting subgraphs (e.g., connected components) with known fraudulent providers and unknown target providers for evaluation by:
      (a) Creating a 'pool' of connected components where each connected component is generated with N-hops from the known fraudulent provider;
      For the purpose of generality, at the process of generating connected components, Er (Er<E) number of edges are removed at random from the set of edges E at the first hop of the selected node; and then the connected components are generated by traversing N hops from the selected node. This process is then repeated for each edge ei (ei∈E) in the first layer from the selected components. The process is then reclusively applied to the following layers to generate a larger set of connected components with topological variety.
      (b) Repeatedly taking a new pair of connected components from the pool and computing graph similarity. The graph similarity is a topological similarity which is separately computed using two different approaches, Maximum Common Subgraph (MCS) and Graph Edit Distance (GED) technique;
      (c) Using the vector from the step above, train a deep learning graph neural network model that learns to classify whether a pair of subgraphs are similar or not.
   (ii) Using the above-trained model for evaluating and classifying 'unknown' connected components to fraudulent connected components:
      (a) To classify the 'unknown' provider, a set of connected components is generated by taking N-hops from the 'unknown' provider;
      (b) Then each connected component is tried using the model trained in the above step, with one connected component from the 'pool'; and
      (c) As the model learns to find similarities between connected components containing fraudulent provider, if the 'unknown' provider is a fraudulent one, the model can classify that one of the connected components of the 'unknown' provider is similar to one of the connected components from the pool of the fraudulent providers' connected components.
3. Associative graph node classification approach: This approach utilizes neural networks (NN) for:
   (i) Training the NN to predict the likelihood of fraudulent behavior of an unknown Provider node;
   (ii) Constructing the model by:
      (a) Using the above-described bad actor association graph;
      (b) Constructing a temporary good actor graph of approximately the same size as the bad actor association graph;
      (c) Temporarily merge the good and bad actor association graphs maintaining an attribute on each node identifying its origin as good or bad and allow connections to form; and
      (d) Cycle through each node in the merged graph to extract attributes, labels, and connection descriptions in order to construct a training/validation data set for the model(s) as follows:
         (i) For each node extract a unique identifier;
         (ii) For each node extract the number of unique attributes known about that node, e.g., address information, contact information (e.g., phone number), etc.;
         (iii) For each node extract a connected component comprising node attributes, its connections to other nodes (topology) up to N-hop;
         (iv) This topology information implicitly takes into consideration, for each node and attribute combination, if there is an edge connection to a bad actor, a good actor, and/or no edge connection at all;
         (v) This information is then fed to a graph neural network for training. The graph is trained based on two things: graph topology and label as fraudulent or benign;
         (vi) Once the model is trained, the 'unknown' provider is evaluated by taking its attributes and topology into consideration to classify the 'unknown' provider into a fraudulent or benign class.
4. People-node subgraph fingerprint comparison: This approach comprises:
   (i) Considering only those nodes and edges in the bad actor association graph that represent natural people as opposed to legal entities and companies;
   (ii) Using labels internal to the bad actor association graph that segments 'bad actor' people from 'unknown' people. Bad Actor people are business labeled because of their clear past association with fraud. These would include but not be limited to those people who have been associated with multiple frauds (often called 'serial incorporators') and those who have been indicted, convicted, or plead guilty to fraud.
   (iii) Assembling a set of connected components starting with bad actor person node using random connections with a depth of N. Only connecting to other nodes that represent natural people;
   (iv) For each component selected, pass their immediate subgraph to a graph embedding system, and arrive at a value to represent their subgraph;
   (v) Constructing a Fingerprint for the original bad actor person node represented as the N values derived in the prior step;
   (vi) Constructing a list of bad actor fingerprints that represent a number of bad actors by combining the individual N fingerprints across the prior step;
   (vii) Repeating steps (iii) to (vi) above using 'unknown' person nodes instead of known bad actors to arrive at a list of unknown fingerprints;
   (viii) Using both the bad actor and unknown fingerprints lists to train a Binary Neural Network to infer the likelihood to be associated with fraud;
   (ix) Using the Binary Neural Network to predict for a person with an unknown fraud status N inferences corresponding that person node's connected components and returning N values of yes or no;
   (x) Using the values returned in step (ix) to classify the results and arrive at a score between 0 and 1 that can be used in the overall ensemble scoring.
      (a) This scoring could be done in multiple ways and with a combination of ways including:
         (i) Any of several known nearest neighbor classification techniques; and
         (ii) Conventional analytics and thresholding techniques for instance counting 'yes' values and determining a score if more than Z values are yes or more than Y % are yes.
      (b) Scores for individual people would be combined and rolled up to represent a portion of the ensemble score of each provider associated with the individual.
         (i) Number of people identified as fraudulent, multiply by their score; and
         (ii) Find their present as well as previous organization for verification.

In step 313, the fraud detection platform 111 provides investigative targets based on the association score. Once a score for an unknown provider's association level to bad actors has been ensembled per the combination of the above-discussed techniques, the association score (also known as fraud connectedness score) and associated graph explanation are enhanced and made useful to investigative management via a combination of the following techniques:

(1) Tranches: The association score can be separated into tranches that can be determined by mathematic (top 10%), statistical (outside 2 standard deviations), or based on a custom ruleset for each user (e.g., payer entity 115).
(2) Expected value or return hurdle: The association score is the likelihood of a hard deny event happening after an investigation. This likelihood times the value generated by a hard deny for a particular payer and type of provider (e.g., DME, Lab, etc.) is used to compute an expected value for each investigative target. Payers can use the expected values to the threshold when they choose to investigate a target. In addition, the expected value can be applied to the cost of the data needed to populate and maintain the bad actor association graph, for example, to determine which data sources used to populate the graph are the best investment.
(3) Standing list of best investigative targets: Populations of providers can be subdivided into types including but not limited to specialty and geography. For a Payer, the solution could score all providers in a user controlled sub-population and maintain a list of the best investigative targets in that sub-population at any time:
   (i) The sub-population could represent the entire population; and
   (ii) Scores could be recomputed in near real-time and/or be updated upon any changes to the bad actor association graph including but not limited to adding new nodes or edges to the graph.
(4) Population scoring: This comprises:
   (i) scoring any one individual provider presented for scoring on a one-by-one basis;
   (ii) scoring a variable population on a recurring basis, for example, those providers that match a rule set daily; and
   (iii) monitoring a known population of providers to determine if their score has changed significantly in a period.

In step 315, the fraud detection platform 111, via the user interface module 211, creates a service delivery scheme. The service delivery scheme is embodied as a customized and configurable solution for each payer using the solution consisting of one or more of the following features:

(1) Synchronous processing on a portal: A payer could input a provider on a webpage and wait a short time and get back an association score, explanation, and any of the enhancements outlined herein.
(2) Batch calls using an API: A payer could input one or more providers using an API and have payload returned or an endpoint hit with the results which would include an association score (explanation, and any of the enhancements outlined in step 313).
(3) Dashboards: One or more business intelligence dashboards could show the highest value investigative targets currently known according to those approaches outlined in step 313. Targets on these dashboards could also be sorted and filtered using a variety of techniques including machine learning and could be represented in different ways both electronic (email alerts or blog posts) and physical (e.g., paper report). The dashboard could include a static or dynamic representation of a sub-graph showing the investigative targets' connections to known fraudulent nodes.
(4) Human curation of connections: Support the human initiated curation of connections formed in the underlying graph. For example, one could query for all officers named John Smith and be given back two companies, XYZ Inc and ABC Corp. This human operator, if he knows them to be different individuals, could click on the John Smith nodes and click a "disconnect" button and enter his reasoning for them being different. The opposite could also be done, where say an investigator finds out that two businesses both belong to the same criminal organizations but outwardly have no indicators suggesting they are related. The investigator could connect the two providers and give an explanation as to why they are connected.

(5) Real-time alerts could be delivered in a variety of ways (e.g., SMS text, etc.) when alterations are made to the bad actor association graph and computations are run to arrive at a new association score(s). Scores exceeding a threshold or those that show a user defined significant level of change would drive an alert to be delivered.

(6) Assignment and Tracking: The service could also handle the assignment of any target for investigation and track the results as the investigation progresses along with the ultimate result.

(7) Commercial integrations: The entire solution is expected to be delivered to drive a commercial economic value including enhanced revenue opportunities to a variety of payers.

Figure 6:
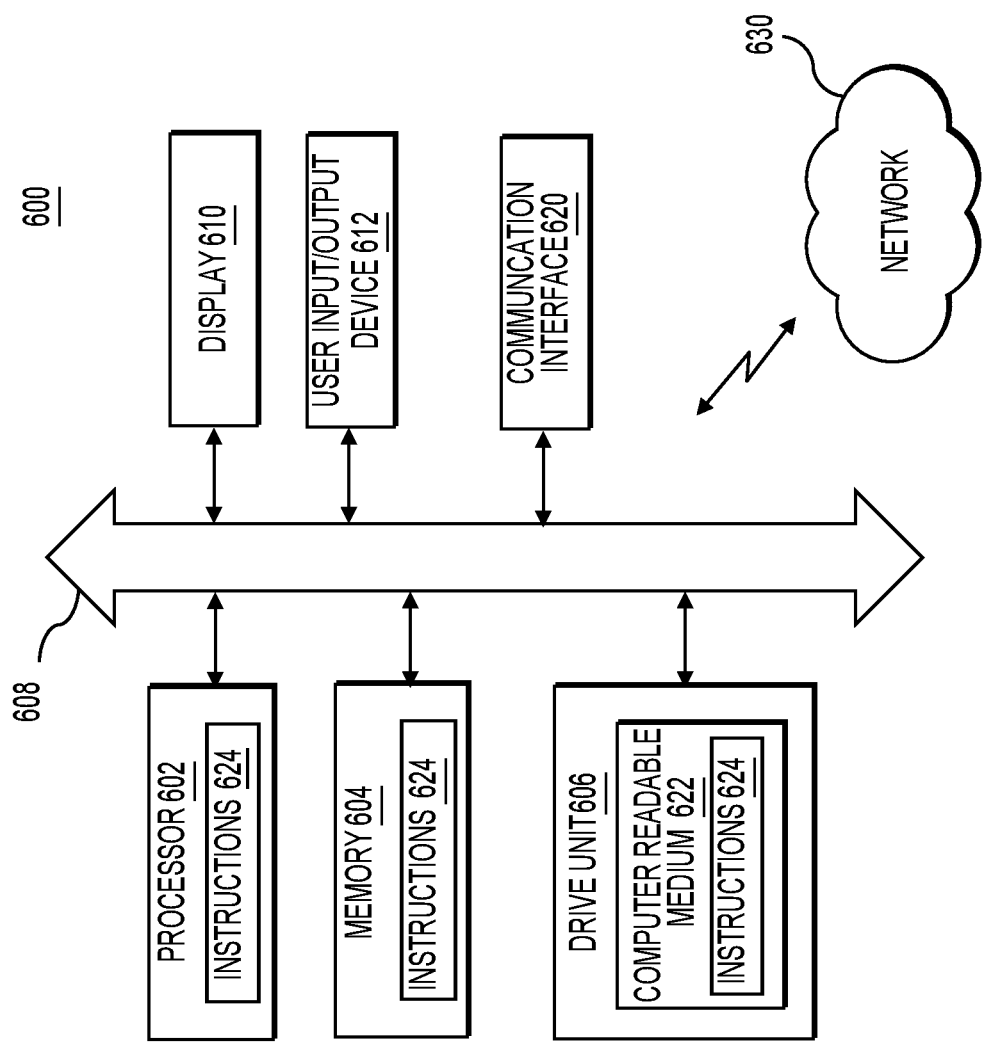
FIG. 6 illustrates an implementation of a computer system that executes techniques presented herein.

FIG. 4 is a flowchart of a process 400 for determining fraudulent entities associated with medical insurance, according to some aspects of the disclosure. In various embodiments, the fraud detection platform 111 and/or any of the modules 201-211 performs one or more portions of the process 400 and are implemented using, for instance, a chip set including a processor and a memory as shown in FIG. 6. As such, the fraud detection platform 111 and/or any of modules 201-211 provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 are performed in any order or combination and need not include all of the illustrated steps.

In step 401, the fraud detection platform 111, via a processor 602, retrieves characteristics data associated with the known fraudulent entities (e.g., provider entity 101). In one embodiment, the characteristics data of the known fraudulent entities include legal information, address information, contact information, or human resources information. In one embodiment, the characteristics data of the known fraudulent entities is retrieved using intelligent agent scripts. The intelligent agent scripts are configured to prioritize a retrieval of specific types of characteristics data associated with known fraudulent entities. The intelligent agent scripts are updated for retrieving new types of characteristics data associated with the fraudulent entities or making different decisions on the characteristics data associated with the fraudulent entities.

In step 403, the fraud detection platform 111, via the processor 602, generates a first graph based on the retrieved characteristics data associated with the known fraudulent entities. The first graph represents relationships among the fraudulent entities and related entities of the known fraudulent entities. In one embodiment, each of the known fraudulent entities and the related entities of the known fraudulent entities is represented as a node in the first graph. In one embodiment, each of the relationships among the known fraudulent entities and the related entities is represented as a connection (e.g., an edge) in the first graph.

In step 405, the fraud detection platform 111, via the processor 602, receives identification data associated with the target entity 102. The identification data associated with the target entity 102 is received before or during the submission of a medical claim by the target entity 102. In one embodiment, the identification data includes TIN, NPI, social security number (SSN), passport number, driver's license number, user credentials, or any other relevant data.

In step 407, the fraud detection platform 111, via the processor 602 using the identification data, retrieves characteristics data associated with the target entity 102. In one embodiment, the characteristics data associated with the target entity 102 includes legal information, address information, contact information, or human resources information associated with the target entity 102.

In step 409, the fraud detection platform 111, via the processor 602, generates a second graph based on the retrieved characteristics data associated with the target entity 102. The second graph represents relationships among the target entity 102 and related entities of the target entity 102. In one embodiment, each of the target entities and the related entities of the target entity 102 is represented as a node in the second graph. In another embodiment, each of the relationships among the target entity 102 and the related entities of the target entity 102 is represented as a connection (e.g., an edge) in the second graph.

In step 411, the fraud detection platform 111, via the processor 602, compares the first graph and the second graph. In one embodiment, comparing the first graph and the second graph includes inserting the second graph into the first graph to determine a degree of association between the second graph and the first graph, the second graph being a sub-graph. In one embodiment, hidden duplicate nodes in the first graph and the second graph are identified using a fuzzy matching algorithm.

In step 413, the fraud detection platform 111, via the processors 602, generates an association score for the target entity 102 based on the comparison. In one embodiment, the fraud detection platform 111 measures connections between the first graph and the second graph. The measurement is based on the count of connections, types of connections, depth of connections, or weighting of connections. In one embodiment, the association score for the target entity is generated using a trained deep learning graph neural network model configured to determine whether the first graph and the second graph are similar. In one embodiment, the fraud detection platform 111, via the machine learning module 203, trains the deep learning graph neural network model by generating a pool of connected components from each known fraudulent entity. The fraud detection platform 111, via the machine learning module 203, iteratively selects a pair of connected components from the pool of connected components to compute graph similarity. The fraud detection platform 111, via the machine learning module 203, trains the deep learning graph neural network model using the computed graph similarity to determine whether a pair of subgraphs are similar.

In one embodiment, the fraud detection platform 111 generates a set of connected components from each known fraudulent entity. The fraud detection platform 111 processes, via a trained deep learning graph neural network model, at least one connected component from the set of connected components to determine similarity with one of the connected components from a pool of the connected components of each known fraudulent entity. The fraud detection platform 111 classifies, via the trained deep learning graph neural network model, at least one connected component as similar to one of the connected components from the pool of the connected components.

In one embodiment, the association score for the target entity is generated using the trained deep learning graph neural network model configured to classify the second graph into a fraudulent class or a non-fraudulent class. In one embodiment, the fraud detection platform 111 retrieves characteristics data associated with known non-fraudulent entities (e.g., good actor providers). The fraud detection platform 111 generates a third graph based on the retrieved characteristics data associated with the known non-fraudulent entities. The third graph represents relationships among the known non-fraudulent entities and related entities of the known non-fraudulent entities. The fraud detection platform 111 merges the first graph and the third graph, wherein the origins of one or more nodes of the merged graph are identified. The fraud detection platform 111 processes one or more nodes to extract at least one of the unique identifiers, attributes, labels, and/or connections. In one embodiment, each of the connections includes an edge connection to a known fraudulent entity, an edge connection to a known non-fraudulent entity, or no edge connection. The fraud detection platform 111 trains the deep learning graph neural network model using the extracted unique identifiers, attributes, labels, and/or connections, wherein the deep learning graph neural network model is trained based on graph topology and labels.

In one embodiment, the association score for the target entity is generated using a trained binary neural network model configured to infer a likelihood of fraud. In one embodiment, the fraud detection platform 111 selects nodes and edges in the first graph that represents fraudulent human users and in the second graph that represents a target human user. The fraud detection platform 111 assembles a set of connected components from the selected nodes and edges. The set of connected components includes other fraudulent human users connected to the fraudulent human users in the first graph or other target human users connected to the target human user in the second graph. The fraud detection platform 111 generates fingerprint data from the assembled set of connected components. The fraud detection platform 111, via the machine learning module 203, trains the binary neural network model using fingerprint data.

In step 415, the fraud detection platform 111, via the processor 602, determines one or more investigative targets based on the association score. In one embodiment, the fraud detection platform 111 categorizes the association score into tranches based, at least in part, on a mathematical calculation or a custom ruleset. In one embodiment, the fraud detection platform 111 calculates an expected value for each of the investigative targets based on the association score and a value generated upon denial of an entity type associated with the corresponding investigative target. The expected value is used to determine whether to investigate the corresponding investigative target. In one embodiment, the fraud detection platform 111 classifies each of the known fraudulent entities based on specialty information or location information. The fraud detection platform 111 generates a score for each of the known fraudulent entities, wherein the score is recomputed, in near real-time, upon detecting changes in the first graph.

In step 417, the fraud detection platform 111, via the processor 602, causes a presentation of the investigative targets to be displayed in a graphical user interface of the UE 103.

Figure 5:
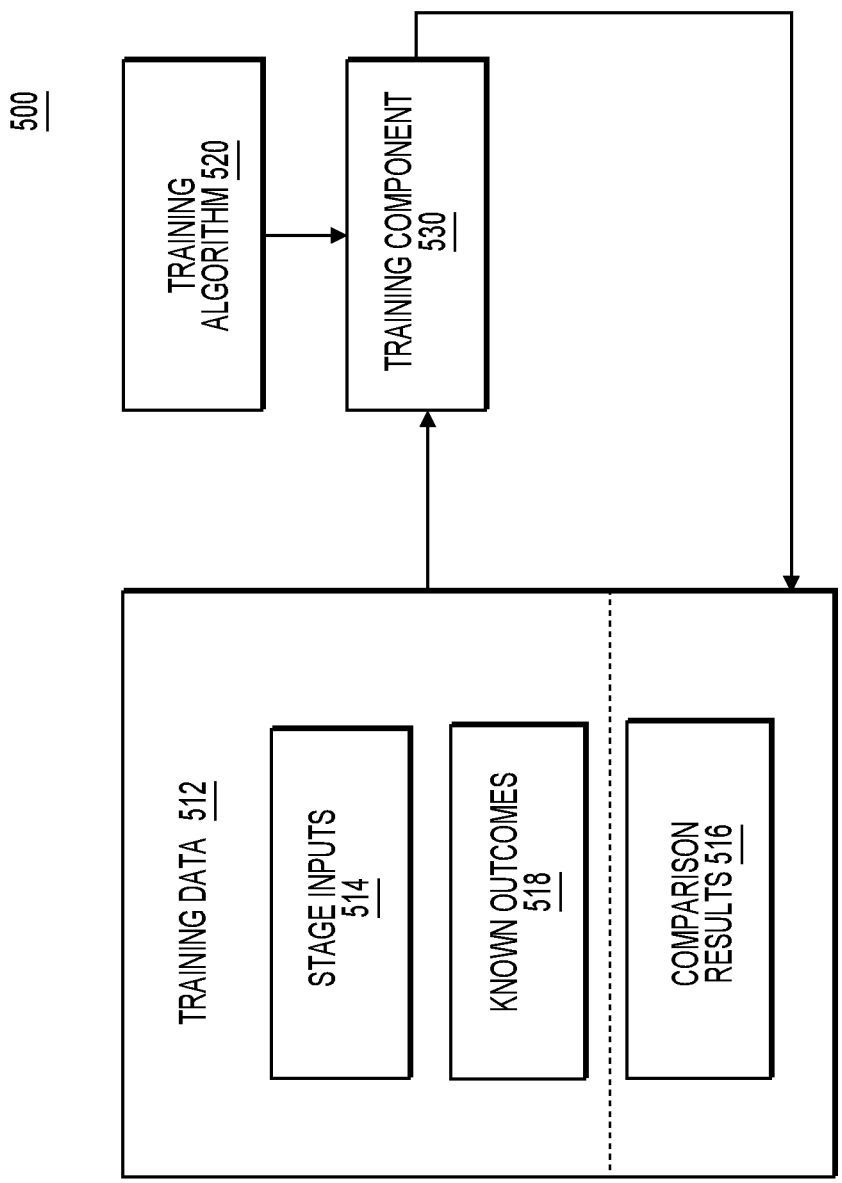
FIG. 5 shows an example machine learning training flow chart.

One or more implementations disclosed herein include and/or are implemented using a machine learning model. For example, one or more of the modules of the fraud detection platform 111, e.g., machine learning module 203, are implemented using a machine learning model and/or are used to train the machine learning model. A given machine learning model is trained using the training flow chart 500 of FIG. 5. Training data 512 includes one or more of stage inputs 514 and known outcomes 518 related to the machine learning model to be trained. Stage inputs 514 are from any applicable source including text, visual representations, data, values, comparisons, and stage outputs, e.g., one or more outputs from one or more steps from FIGS. 3A and 4. The known outcomes 518 are included for the machine learning models generated based on supervised or semi-supervised training. An unsupervised machine learning model may not be trained using known outcomes 518. Known outcomes 518 includes known or desired outputs for future inputs similar to or in the same category as stage inputs 514 that do not have corresponding known outputs.

The training data 512 and a training algorithm 520, e.g., one or more of the modules implemented using the machine learning model and/or are used to train the machine learning model, is provided to a training component 530 that applies the training data 512 to the training algorithm 520 to generate the machine learning model. According to an implementation, the training component 530 is provided comparison results 516 that compare a previous output of the corresponding machine learning model to apply the previous result to re-train the machine learning model. The comparison results 516 are used by training component 530 to update the corresponding machine learning model. The training algorithm 520 utilizes machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, the model specifically discussed herein, or the like.

The machine learning model used herein is trained and/or used by adjusting one or more weights and/or one or more layers of the machine learning model. For example, during training, a given weight is adjusted (e.g., increased, decreased, removed) based on training data or input data. Similarly, a layer is updated, added, or removed based on training data/and or input data. The resulting outputs are adjusted based on the adjusted weights and/or layers.

In general, any process or operation discussed in this disclosure is understood to be computer-implementable, such as the process illustrated in FIGS. 3A and 4 are performed by one or more processors of a computer system as described herein. A process or process step performed by one or more processors is also referred to as an operation. The one or more processors are configured to perform such processes by having access to instructions (e.g., software or computer-readable code) that, when executed by one or more processors, cause one or more processors to perform the processes. The instructions are stored in a memory of the computer system. A processor is a central processing unit (CPU), a graphics processing unit (GPU), or any suitable type of processing unit.

A computer system, such as a system or device implementing a process or operation in the examples above, includes one or more computing devices. One or more processors of a computer system are included in a single computing device or distributed among a plurality of computing devices. One or more processors of a computer system are connected to a data storage device. A memory of the computer system includes the respective memory of each computing device of the plurality of computing devices.

FIG. 6 illustrates an implementation of a computer system that executes techniques presented herein. The computer system 600 includes a set of instructions that are executed to cause the computer system 600 to perform any one or more of the methods or computer based functions disclosed herein. The computer system 600 operates as a standalone device or is connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" refers to any device or portion of a device that processes electronic data, e.g., from registers and/or memory to transform that electronic data into other electronic data that, e.g., is stored in registers and/or memory. A "computer," a "computing machine," a "computing platform," a "computing device," or a "server" includes one or more processors.

In a networked deployment, the computer system 600 operates in the capacity of a server or as a client user computer in a server-client user network environment, or as a peer computer system in a peer-to-peer (or distributed) network environment. The computer system 600 is also implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 is implemented using electronic devices that provide voice, video, or data communication. Further, while the computer system 600 is illustrated as a single system, the term "system" shall also be taken to include any collection of systems or sub-systems that individually or jointly execute a set, or multiple sets, of instructions to perform one or more computer functions.

As illustrated in FIG. 6, the computer system 600 includes a processor 602, e.g., a central processing unit (CPU), a graphics processing unit (GPU), or both. The processor 602 is a component in a variety of systems. For example, the processor 602 is part of a standard personal computer or a workstation. The processor 602 is one or more processors, digital signal processors, application specific integrated circuits, field programmable gate arrays, servers, networks, digital circuits, analog circuits, combinations thereof, or other now known or later developed devices for analyzing and processing data. The processor 602 implements a software program, such as code generated manually (e.g., programmed).

The computer system 600 includes a memory 604 that communicates via bus 608. Memory 604 is a main memory, a static memory, or a dynamic memory. Memory 604 includes, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. Memory 604 is an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts, or tasks illustrated in the figures or described herein are performed by processor 602 executing the instructions stored in memory 604. The functions, acts, or tasks are independent of the particular type of instruction set, storage media, processor, or processing strategy and are performed by software, hardware, integrated circuits, firmware, micro-code, and the like, operating alone or in combination. Likewise, processing strategies include multiprocessing, multitasking, parallel processing, and the like.

As shown, the computer system 600 further includes a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 acts as an interface for the user to see the functioning of the processor 602, or specifically as an interface with the software stored in the memory 604 or in the drive unit 606.

Additionally or alternatively, the computer system 600 includes an input/output device 612 configured to allow a user to interact with any of the components of the computer system 600. The input/output device 612 is a number pad, a keyboard, a cursor control device, such as a mouse, a joystick, touch screen display, remote control, or any other device operative to interact with the computer system 600.

The computer system 600 also includes the drive unit 606 implemented as a disk or optical drive. The drive unit 606 includes a computer-readable medium 622 in which one or more sets of instructions 624, e.g. software, is embedded. Further, the sets of instructions 624 embodies one or more of the methods or logic as described herein. Instructions 624 resides completely or partially within memory 604 and/or within processor 602 during execution by the computer system 600. The memory 604 and the processor 602 also include computer-readable media as discussed above.

In some systems, computer-readable medium 622 includes the set of instructions 624 or receives and executes the set of instructions 624 responsive to a propagated signal so that a device connected to network 630 communicates voice, video, audio, images, or any other data over network 630. Further, the sets of instructions 624 are transmitted or received over the network 630 via the communication port or interface 620, and/or using the bus 608. The communication port or interface 620 is a part of the processor 602 or is a separate component. The communication port or interface 620 is created in software or is a physical connection in hardware. The communication port or interface 620 is configured to connect with the network 630, external media, display 610, or any other components in the computer system 600, or combinations thereof. The connection with network 630 is a physical connection, such as a wired Ethernet connection, or is established wirelessly as discussed below. Likewise, the additional connections with other components of the computer system 600 are physical connections or are established wirelessly. Network 630 alternatively be directly connected to the bus 608.

While the computer-readable medium 622 is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding, or carrying a set of instructions for execution by a processor or that causes a computer system to perform any one or more of the methods or operations disclosed herein. The computer-readable medium 622 is non-transitory, and may be tangible.

The computer-readable medium 622 includes a solid-state memory such as a memory card or other package that houses one or more non-volatile read-only memories. The computer-readable medium 622 is a random-access memory or other volatile re-writable memory. Additionally or alternatively, the computer-readable medium 622 includes a magneto-optical or optical medium, such as a disk or tapes or other storage device to capture carrier wave signals such as a signal communicated over a transmission medium. A digital file attachment to an e-mail or other self-contained information archive or set of archives is considered a distribution medium that is a tangible storage medium. Accordingly, the disclosure is considered to include any one or more of a computer-readable medium or a distribution medium and other equivalents and successor media, in which data or instructions are stored.

In an alternative implementation, dedicated hardware implementations, such as application specific integrated circuits, programmable logic arrays, and other hardware devices, is constructed to implement one or more of the methods described herein. Applications that include the apparatus and systems of various implementations broadly include a variety of electronic and computer systems. One or more implementations described herein implement functions using two or more specific interconnected hardware modules or devices with related control and data signals that are communicated between and through the modules, or as portions of an application-specific integrated circuit. Accordingly, the present system encompasses software, firmware, and hardware implementations.

Computer system 600 is connected to network 630. Network 630 defines one or more networks including wired or wireless networks. The wireless network is a cellular telephone network, an 802.10, 802.16, 802.20, or WiMAX network. Further, such networks include a public network, such as the Internet, a private network, such as an intranet, or combinations thereof, and utilizes a variety of networking protocols now available or later developed including, but not limited to TCP/IP based networking protocols. Network 630 includes wide area networks (WAN), such as the Internet, local area networks (LAN), campus area networks, metropolitan area networks, a direct connection such as through a Universal Serial Bus (USB) port, or any other networks that allows for data communication. Network 630 is configured to couple one computing device to another computing device to enable communication of data between the devices. Network 630 is generally enabled to employ any form of machine-readable media for communicating information from one device to another. Network 630 includes communication methods by which information travels between computing devices. Network 630 is divided into sub-networks. The sub-networks allow access to all of the other components connected thereto or the sub-networks restrict access between the components. Network 630 is regarded as a public or private network connection and includes, for example, a virtual private network or an encryption or other security mechanism employed over the public Internet, or the like.

In accordance with various implementations of the present disclosure, the methods described herein are implemented by software programs executable by a computer system. Further, in an example, non-limited implementation, implementations can include distributed processing, component/object distributed processing, and parallel processing. Alternatively, virtual computer system processing can be constructed to implement one or more of the methods or functionality as described herein.

Although the present specification describes components and functions that are implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (e.g., computer) system executing instructions (computer-readable code) stored in storage. It will also be understood that the disclosure is not limited to any particular implementation or programming technique and that the disclosure is implemented using any appropriate techniques for implementing the functionality described herein. The disclosure is not limited to any particular programming language or operating system.

It should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention are practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications are made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

The present disclosure furthermore relates to the following aspects.

Example 1. A computer-implemented method for determining fraudulent entities, comprising: retrieving, via one or more processors, characteristics data associated with one or more known fraudulent entities; generating, via the one or more processors, a first graph based on the retrieved characteristics data associated with the one or more known fraudulent entities, the first graph representing relationships among the one or more fraudulent entities and one or more related entities of the one or more known fraudulent entities; receiving, via the one or more processors, identification data associated with a target entity; retrieving, via the one or more processors and using the identification data, characteristics data associated with the target entity; generating, via the one or more processors, a second graph based on the retrieved characteristics data associated with the target entity, the second graph representing relationships among the target entity and one or more related entities of the target entity; comparing, via the one or more processors, the first graph and the second graph; generating, by the one or more processors, an association score for the target entity based on the comparison; determining, via the one or more processors, one or more investigative targets based on the association score; and causing, by the one or more processors, a presentation of the one or more investigative targets to be displayed via a graphical user interface of a device.

Example 2. The computer-implemented method of example 1, wherein the characteristics data of the one or more known fraudulent entities comprises at least one of: legal information, address information, contact information, or human resources information associated with the one or more known fraudulent entities.

Example 3. The computer-implemented method of any of the preceding examples, wherein the characteristics data of the one or more known fraudulent entities is retrieved using one or more intelligent agent scripts, the one or more intelligent agent scripts configured to prioritize retrieval of specific types of characteristics data associated with the one or more known fraudulent entities.

Example 4. The computer-implemented method of example 3, wherein the intelligent agent scripts are updated for at least one of: retrieving new types of characteristics data associated with the one or more fraudulent entities or making different decisions on the characteristics data associated with the one or more fraudulent entities.

Example 5. The computer-implemented method of any of the preceding examples, wherein the characteristics data associated with the target entity comprises at least one of: legal information, address information, contact information, or human resources information associated with the target entity.

Example 6. The computer-implemented method of any of the preceding examples, wherein the identification data associated with the target entity is received before or during submission of a medical claim by the target entity.

Example 7. The computer-implemented method of any of the preceding examples, wherein: each of the one or more known fraudulent entities and the one or more related entities of the one or more known fraudulent entities is represented as a node in the first graph, each of the relationships among the one or more known fraudulent entities and the related entities of the one or more known fraudulent entities is represented as a connection in the first graph, each of the target entity and the one or more related entities of the target entity is represented as a node in the second graph, and each of the relationships among the target entity and the one or more related entities of the target entity is represented as a connection in the second graph.

Example 8. The computer-implemented method of example 7, wherein comparing the first graph and the second graph comprises: inserting, via the one or more processors, the second graph into the first graph to determine a degree of association between the second graph and the first graph, the second graph being a sub-graph.

Example 9. The computer-implemented method of example 8, wherein hidden duplicate nodes in the first graph and the second graph are identified using a fuzzy matching algorithm.

Example 10. The computer-implemented method of any of the preceding examples, wherein generating the association score for the target entity comprises: measuring, via the one or more processors, connections between the first graph and the second graph, wherein the measurement is based on at least one of: count of connections, types of connections, depth of connections, or weighting of connections.

Example 11. The computer-implemented method of any of the preceding examples, wherein the association score for the target entity is generated using a trained deep learning graph neural network model configured to determine whether the first graph and the second graph are similar, wherein the trained deep learning graph neural network model is trained by: generating, via the one or more processors, a pool of connected components from each known fraudulent entity; iteratively selecting, via the one or more processors, a pair of connected components from the pool of connected components to compute graph similarity; and training, via the one or more processors, the deep learning graph neural network model using the computed graph similarity to determine whether a pair of subgraphs are similar.

Example 12. The computer-implemented method of example 11, wherein generating the association score for the target entity comprises: generating, via the one or more processors, a set of connected components from each known fraudulent entity; processing, via a trained deep learning graph neural network model, at least one connected component from the set of connected components to determine similarity with one of the connected components from a pool of the connected components of each known fraudulent entity; and classifying, via the trained deep learning graph neural network model, the at least one connected component as similar to the one of the connected components from the pool of the connected components.

Example 13. The computer-implemented method of any of the preceding examples, wherein the association score for the target entity is generated using a trained deep learning graph neural network model configured to classify the second graph into a fraudulent class or a non-fraudulent class, wherein the trained deep learning graph neural network model is trained by: retrieving, via the one or more processors, characteristics data associated with one or more known non-fraudulent entities; generating, via the one or more processors, a third graph based on the retrieved characteristics data associated with the one or more known non-fraudulent entities, the third graph representing relationships among the one or more known non-fraudulent entities and one or more related entities of the one or more known non-fraudulent entities; merging, via the one or more processors, the first graph and the third graph, wherein origins of one or more nodes of the merged graph are identified; processing, via the one or more processors, the one or more nodes to extract at least one of unique identifiers, attributes, labels, and/or connections; and training, via the one or more processors, the deep learning graph neural network model using the extracted at least one of unique identifiers, attributes, labels, and/or connections, wherein the deep learning graph neural network model is trained based on graph topology and labels.

Example 14. The computer-implemented method of example 13, wherein each of the connections includes at least one of an edge connection to a known fraudulent entity, an edge connection to a known non-fraudulent entity, or no edge connection.

Example 15. The computer-implemented method of any of the preceding examples, wherein the association score for the target entity is generated using a trained neural network model configured to infer a likelihood of fraud, wherein the trained neural network model is trained by: selecting, via the one or more processors, nodes and edges in the first graph that represent fraudulent human users and nodes and edges in the second graph that represent a target human user; assembling, via the one or more processors, a set of connected components from the nodes and edges of the fraudulent human users in the first graph and the target human user in the second graph, wherein the set of connected components includes other fraudulent human users connected to the fraudulent human users in the first graph or other target human user connected to the target human user in the second graph; generating, via the one or more processors, fingerprint data from the assembled set of connected components; and training, via the one or more processors, the neural network model using the fingerprint data.

Example 16. The computer-implemented method of any of the preceding examples, wherein determining the one or more investigative targets comprises: categorizing, via the one or more processors, the association score into tranches based, at least in part, on a mathematical calculation or a custom ruleset.

Example 17. The computer-implemented method of any of the preceding examples, wherein determining the one or more investigative targets comprises: calculating, via the one or more processors, an expected value for each of the one or more investigative targets based, at least in part, on the association score and a value generated upon denial of an entity type associated with corresponding investigative target, wherein the expected value is used to determine whether to investigate the corresponding investigative target.

Example 18. The computer-implemented method of any of the preceding examples, wherein determining the one or more investigative targets further comprises: classifying, via the one or more processors, each of the one or more known fraudulent entities based on at least one of specialty information or location information; and generating, via the one or more processors, a score for each of the one or more known fraudulent entities, wherein the score is recomputed, in near real-time, upon detecting changes in the first graph.

Example 19. A system for determining fraudulent entities, comprising: one or more processors; and at least one non-transitory computer readable medium storing instructions which, when executed by the one or more processors, cause the one or more processors to perform operations comprising: retrieving characteristics data associated with one or more known fraudulent entities; generating a first graph based on the retrieved characteristics data associated with the one or more known fraudulent entities, the first graph representing relationships among the one or more fraudulent entities and one or more related entities of the one or more known fraudulent entities; receiving identification data associated with a target entity; retrieving, using the identification data, characteristics data associated with the target entity; generating a second graph based on the retrieved characteristics data associated with the target entity, the second graph representing relationships among the target entity and one or more related entities of the target entity; comparing the first graph and the second graph; generating an association score for the target entity based on the comparison; determining one or more investigative targets based on the association score; and causing a presentation of the one or more investigative targets to be displayed via a graphical user interface of a device.

Example 20. A non-transitory computer readable medium for determining fraudulent entities, the non-transitory computer readable medium storing instructions which, when executed by one or more processors, cause the one or more processors to perform operations comprising: retrieving characteristics data associated with one or more known fraudulent entities; generating a first graph based on the retrieved characteristics data associated with the one or more known fraudulent entities, the first graph representing relationships among the one or more fraudulent entities and one or more related entities of the one or more known fraudulent entities; receiving identification data associated with a target entity; retrieving, using the identification data, characteristics data associated with the target entity; generating a second graph based on the retrieved characteristics data associated with the target entity, the second graph representing relationships among the target entity and one or more related entities of the target entity; comparing the first graph and the second graph; generating an association score for the target entity based on the comparison; determining one or more investigative targets based on the association score; and causing a presentation of the one or more investigative targets to be displayed via a graphical user interface of a device.

What is claimed is:

1. A computer-implemented method for determining fraudulent entities, comprising:
   receiving, by one or more processors, one or more resource requests associated with a target entity;
   retrieving, by the one or more processors, first characteristics data associated with one or more known fraudulent entities;
   generating, by the one or more processors, a first graph based on the first characteristics data, the first graph representing (i) each of the one or more known fraudulent entities and one or more first related entities of the one or more known fraudulent entities as a first node, and (ii) each of a plurality of relationships between the one or more known fraudulent entities and the one or more first related entities as a first connection;
   receiving, by the one or more processors, identification data associated with the target entity;
   retrieving, by the one or more processors and using the identification data, second characteristics data associated with the target entity;
   generating, by the one or more processors, a second graph based on the second characteristics data, the second graph representing (i) each of the target entity and one or more second related entities of the target entity as a second node, and (ii) each of the relationships between the target entity and the one or more second related entities as a second connection;
   generating, by the one or more processors, an association score for the target entity using a first deep learning graph neural network configured to determine whether the first graph and the second graph are similar, wherein the first deep learning graph neural network is trained by:
      generating a pool of connected components based on the first graph and the second graph, wherein the pool of connected components represents one or more first attributes linked to the known fraudulent entity in the first graph and the target entity in the second graph;
      iteratively selecting a pair of connected components from the pool of connected components in the first graph and the second graph to compute graph similarity; and
      training the first deep learning graph neural network using the computed graph similarity to determine a similarity between a pair of graphs;
   determining, by the one or more processors, that the target entity is an investigative target based on the association score;
   causing, by the one or more processors, a presentation of the investigative target to be displayed by a graphical user interface of a device, wherein the presentation includes a dynamic representation of a third graph indicating a third connection between (i) the target entity in the second graph, identified as the investigative target, and (ii) one or more first nodes representing the one or more known fraudulent entities in the first graph; and
   generating, by the one or more processors, computer-executable instructions to invalidate the one or more resource requests associated with the target entity.

2. The computer-implemented method of claim 1, wherein the first characteristics data comprises at least one of: legal information, address information, contact information, or human resources information associated with the one or more known fraudulent entities.

3. The computer-implemented method of claim 1, wherein the first characteristics data is retrieved using one or more intelligent agent scripts, the one or more intelligent agent scripts configured to prioritize retrieval of specific types of characteristics data associated with the one or more known fraudulent entities.

4. The computer-implemented method of claim 3, wherein the intelligent agent scripts are updated for at least one of: retrieving new types of characteristics data associated with the one or more known fraudulent entities or making different decisions on the first characteristics data.

5. The computer-implemented method of claim 1, wherein the second characteristics data comprises at least one of: legal information, address information, contact information, or human resources information associated with the target entity.

6. The computer-implemented method of claim 1, wherein the identification data associated with the target entity is received before or during submission of a medical claim by the target entity.

7. The computer-implemented method of claim 1, wherein generating the association score further comprises:
   comparing, by the one or more processors, the first graph and the second graph by inserting, by the one or more processors, the second graph into the first graph to determine a degree of association between the second graph and the first graph.

8. The computer-implemented method of claim 7, wherein hidden duplicate nodes in the first graph and the second graph are identified using a fuzzy matching algorithm.

9. The computer-implemented method of claim 1, wherein generating the association score further comprises:
   measuring, by the one or more processors, connections between the first graph and the second graph based on at least one of: count of connections, types of connections, depth of connections, or weighting of connections.

10. The computer-implemented method of claim 1, wherein generating the association score further comprises:
    generating, by the one or more processors, a set of connected components from each known fraudulent entity in the one or more known fraudulent entities, wherein the set of connected components comprises one or more of the one or more known fraudulent entities in the first graph and one or more target entities in the second graph, the one or more target entities comprising the target entity;
    processing, by the first deep learning graph neural network, at least one connected component from the set of connected components to determine similarity with one of the set of connected components from the pool of connected components of each known fraudulent entity in the one or more known fraudulent entities; and
    classifying, by the first deep learning graph neural network, the at least one connected component as similar to the one of the set of connected components from the pool of connected components.

11. The computer-implemented method of claim 1, wherein generating the association score further comprises using a second deep learning graph neural network configured to classify the second graph into a fraudulent class or a non-fraudulent class, wherein the second deep learning graph neural network is trained by:
retrieving, by the one or more processors, third characteristics data associated with one or more known non-fraudulent entities;
generating, by the one or more processors, a fourth graph based on the third characteristics data, the fourth graph representing relationships among the one or more known non-fraudulent entities and one or more third related entities of the one or more known non-fraudulent entities;
merging, by the one or more processors, the first graph and the fourth graph, wherein origins of one or more second nodes of the merged graph are identified;
processing, by the one or more processors, the one or more second nodes to extract at least one of unique identifiers, second attributes, labels, or connections; and
training, by the one or more processors, the second deep learning graph neural network using the extracted at least one of the unique identifiers, the second attributes, the labels, or the connections to identify non-fraudulent entities for classifying the second graph into the non-fraudulent class, wherein the second deep learning graph neural network is trained based on graph topology and labels.

12. The computer-implemented method of claim 11, wherein each of the connections includes at least one of an edge connection to a known fraudulent entity, an edge connection to a known non-fraudulent entity, or no edge connection.

13. The computer-implemented method of claim 1, wherein generating the association score further comprises using a neural network configured to infer a likelihood of fraud, wherein the neural network is trained by:
selecting, by the one or more processors, third nodes and third edges in the first graph that represent fraudulent human users and fourth nodes and fourth edges in the second graph that represent a target human user;
assembling, by the one or more processors, a set of connected components from the third nodes and the third edges and the fourth nodes and the fourth edges, wherein the set of connected components includes other fraudulent human users connected to the fraudulent human users in the first graph or other target human users connected to the target human user in the second graph;
generating, by the one or more processors, fingerprint data from the set of connected components; and
training, by the one or more processors, the neural network using the fingerprint data.

14. The computer-implemented method of claim 1, wherein determining the investigative target further comprises:
categorizing, by the one or more processors, the association score into tranches based, at least in part, on a calculation of an expected value and a value generated upon denial of an entity type associated with the investigative target or a custom ruleset.

15. The computer-implemented method of claim 14, wherein determining the investigative target further comprises:
calculating, by the one or more processors, the expected value for the investigative target based, at least in part, on the association score and the value, wherein the expected value is used to determine whether to investigate the investigative target.

16. The computer-implemented method of claim 1, wherein determining the investigative target further comprises:
classifying, by the one or more processors, each of the one or more known fraudulent entities based on at least one of specialty information or location information; and
generating, by the one or more processors, a score for each of the one or more known fraudulent entities, wherein the score is recomputed, in near real-time, upon detecting changes in the first graph.

17. A system for determining fraudulent entities, comprising:
one or more processors; and
one or more memories storing processor-executable instructions that, when executed by the one or more processors, cause the one or more processors to perform operations comprising:
receiving one or more resource requests associated with a target entity;
retrieving first characteristics data associated with one or more known fraudulent entities;
generating a first graph based on the first characteristics data, the first graph representing (i) each of the one or more known fraudulent entities and one or more first related entities of the one or more known fraudulent entities as a first node, and (ii) each of a plurality of relationships between the one or more known fraudulent entities and the one or more first related entities as a first connection;
receiving identification data associated with the target entity;
retrieving, using the identification data, second characteristics data associated with the target entity;
generating a second graph based on the second characteristics data, the second graph representing (i) each of the target entity and one or more second related entities of the target entity as a second node, and (ii) each of the relationships between the target entity and the one or more second related entities as a second connection;
generating an association score for the target entity using a first deep learning graph neural network configured to determine whether the first graph and the second graph are similar wherein the first deep learning graph neural network is trained by:
generating a pool of connected components based on the first graph and the second graph, wherein the pool of connected components represents one or more first attributes linked to the known fraudulent entity in the first graph and the target entity in the second graph;
iteratively selecting a pair of connected components from the pool of connected components in the first graph and the second graph to compute graph similarity; and
training the first deep learning graph neural network using the computed graph similarity to determine a similarity between a pair of graphs;

determining that the target entity is an investigative target based on the association score;

causing a presentation of the investigative target to be displayed by a graphical user interface of a device, wherein the presentation includes a dynamic representation of a third graph indicating a third connection between (i) the target entity in the second graph, identified as the investigative target, and (ii) one or more first nodes representing the one or more known fraudulent entities in the first graph; and generating computer-executable instructions to invalidate the one or more resource requests associated with the target entity.

18. The system of claim 17, wherein generating the association score further comprises:

generating a set of connected components from each known fraudulent entity in the one or more known fraudulent entities, wherein the set of connected components comprises one or more of the one or more known fraudulent entities in the first graph and one or more target entities in the second graph, the one or more tartet entities comprising the target entity;

processing, by the first deep learning graph neural network, at least one connected component from the set of connected components to determine similarity with one of the set of connected components from the pool of connected components of each known fraudulent entity in the one or more known fraudulent entities; and classifying, by the first deep learning graph neural network, the at least one connected component as similar to the one of the set of connected components from the pool of connected components.

19. The system of claim 17, wherein generating the association score further comprises using a second deep learning graph neural network configured to classify the second graph into a fraudulent class or a non-fraudulent class, wherein the second deep learning graph neural network is trained by:

retrieving third characteristics data associated with one or more known non-fraudulent entities;

generating a fourth graph based on the third characteristics data, the fourth graph representing relationships among the one or more known non-fraudulent entities and one or more third related entities of the one or more known non-fraudulent entities;

merging the first graph and the fourth graph, wherein origins of one or more second nodes of the merged graph are identified;

processing the one or more second nodes to extract at least one of unique identifiers, second attributes, labels, or connections; and training the second deep learning graph neural network using the extracted at least one of the unique identifiers, the second attributes, the labels, or the connections to identify non-fraudulent entities for classifying the second graph into the non-fraudulent class, wherein the second deep learning graph neural network is trained based on graph topology and labels.

20. One or more non-transitory computer readable media for determining fraudulent entities, the non-transitory computer readable media storing instructions which, when executed by one or more processors, cause the one or more processors to perform operations comprising:

receiving one or more resource requests associated with a target entity;

retrieving first characteristics data associated with one or more known fraudulent entities;

generating a first graph based on the first characteristics data, the first graph representing (i) each of the one or more known fraudulent entities and one or more first related entities of the one or more known fraudulent entities as a first node, and (ii) each of a plurality of relationships between the one or more known fraudulent entities and the one or more first related entities as a first connection;

receiving identification data associated with the target entity;

retrieving, using the identification data, second characteristics data associated with the target entity;

generating a second graph based on the second characteristics data, the second graph representing (i) each of the target entity and one or more second related entities of the target entity as a second node, and (ii) each of the relationships between the target entity and the one or more second related entities as a second connection;

generating an association score for the target entity using a first deep learning graph neural network configured to determine whether the first graph and the second graph are similar, wherein the first deep learning graph neural network is trained by:

generating a pool of connected components based on the first graph and the second graph, wherein the pool of connected components represents one or more first attributes linked to the known fraudulent entity in the first graph and the target entity in the second graph;

iteratively selecting a pair of connected components from the pool of connected components in the first graph and the second graph to compute graph similarity; and training the first deep learning graph neural network using the computed graph similarity to determine a similarity between a pair of graphs;

determining that the target entity is an investigative target based on the association score;

causing a presentation of the investigative target to be displayed by a graphical user interface of a device, wherein the presentation includes a dynamic representation of a third graph indicating a third connection between (i) the target entity in the second graph, identified as the investigative target, and (ii) one or more first nodes representing the one or more known fraudulent entities in the first graph; and generating computer-executable instructions to invalidate the one or more resource requests associated with the target entity.

\* \* \* \* \*

UNITED STATES PATENT AND TRADEMARK OFFICE
CERTIFICATE OF CORRECTION

| | | |
|---|---|---|
| PATENT NO. | : 12,236,490 B2 | Page 1 of 1 |
| APPLICATION NO. | : 18/311378 | |
| DATED | : February 25, 2025 | |
| INVENTOR(S) | : Thomas R. Gilbertson et al. | |

It is certified that error appears in the above-identified patent and that said Letters Patent is hereby corrected as shown below:

In the Claims

In Column 32, Claim 17, Line 53, delete "similar" and insert --similar,--

In Column 33, Claim 18, Line 22, delete "tartet" and insert --target--

Signed and Sealed this
Fifteenth Day of April, 2025

Coke Morgan Stewart
*Acting Director of the United States Patent and Trademark Office*